(12) United States Patent
Hall

(10) Patent No.: US 9,253,527 B2
(45) Date of Patent: Feb. 2, 2016

(54) SOCIAL MULTI-CAMERA INTERACTIVE LIVE ENGAGEMENT SYSTEM

(71) Applicant: Smiletime, Inc., Santa Monica, CA (US)

(72) Inventor: Jason Hall, North Hollywood, CA (US)

(73) Assignee: SMILETIME INC, Santa Monica, CA (US)

( * ) Notice: Subject to any disclaimer, the term of this patent is extended or adjusted under 35 U.S.C. 154(b) by 0 days.

(21) Appl. No.: 14/542,475

(22) Filed: Nov. 14, 2014

(65) Prior Publication Data

US 2015/0135234 A1    May 14, 2015

Related U.S. Application Data

(60) Provisional application No. 61/904,413, filed on Nov. 14, 2013.

(51) Int. Cl.
*G06F 3/00* (2006.01)
*G06F 13/00* (2006.01)
*H04N 5/445* (2011.01)
*H04N 21/431* (2011.01)
(Continued)

(52) U.S. Cl.
CPC ....... *H04N 21/4316* (2013.01); *H04N 21/2343* (2013.01); *H04N 21/2365* (2013.01); *H04N 21/2665* (2013.01); *H04N 21/4355* (2013.01); *H04N 21/4402* (2013.01); *H04N 21/4622* (2013.01); *H04N 21/4788* (2013.01); *H04N 21/482* (2013.01); *H04N 21/6125* (2013.01); *H04N 21/8173* (2013.01)

(58) Field of Classification Search
USPC ................ 725/37, 38, 41, 43, 49, 59, 61, 114
See application file for complete search history.

(56) References Cited

U.S. PATENT DOCUMENTS 7,079,176 B1 * 7/2006 Freeman .................. G03C 1/26
                                                                  348/207.1
8,973,047 B2 * 3/2015 Kim .............................. 725/47
(Continued)

FOREIGN PATENT DOCUMENTS

| JP | 2008099248 | 4/2008 |
| KR | 10-20120105205 | 9/2012 |
| WO | 2015073924 | 5/2015 |

OTHER PUBLICATIONS

PCT; International Search Report and Written Opinion dated Feb. 6, 2015 in Application No. PCT/US2014/065838.

*Primary Examiner* — Nnenna Ekpo
(74) *Attorney, Agent, or Firm* — Jonathan Jaech; Snell & Wilmer L.L.P.

(57) ABSTRACT

A social multi-camera interactive live engagement (SMILE) system including video and audio processing arrays performs an audio-video processing method. The method includes receiving multiple video streams from distinct sources and preparing multiple distinct composited video streams from the multiple video streams. Each of the distinct composited video streams configures video images from a different selected one of the multiple video streams in a primary region and video images from remaining ones of the multiple video streams in respective secondary regions adjacent to the primary region. The method include streaming the multiple distinct composited video streams configured for presentation in a user interface to a client device, at different times determined in response to user selection input from the client device, and more detailed aspects, supporting a novel user interface design.

24 Claims, 21 Drawing Sheets

(51) Int. Cl.
*H04N 21/2665* (2011.01)
*H04N 21/462* (2011.01)
*H04N 21/482* (2011.01)
*H04N 21/61* (2011.01)
*H04N 21/81* (2011.01)
*H04N 21/2365* (2011.01)
*H04N 21/4788* (2011.01)
*H04N 21/2343* (2011.01)
*H04N 21/435* (2011.01)
*H04N 21/4402* (2011.01)

(56) References Cited

U.S. PATENT DOCUMENTS

| | | | |
|---|---|---|---|
| 9,094,615 B2 * | 7/2015 | Aman | G01S 3/7864 |
| 9,100,540 B1 * | 8/2015 | Gates | H04N 7/15 |
| 2002/0113812 A1 * | 8/2002 | Walker et al. | 345/719 |
| 2006/0288375 A1 * | 12/2006 | Ortiz | H04H 5/232 725/62 |
| 2007/0094698 A1 * | 4/2007 | Bountour | H04N 7/181 725/132 |
| 2007/0294734 A1 * | 12/2007 | Arsenault et al. | 725/87 |
| 2008/0104127 A1 * | 5/2008 | Billmaier et al. | 707/200 |
| 2008/0209472 A1 * | 8/2008 | Shanks | H04H 5/44543 725/43 |
| 2008/0263592 A1 * | 10/2008 | Kimber | G06F 3/0486 725/38 |
| 2010/0188485 A1 | 7/2010 | Abrams | |
| 2011/0007130 A1 | 1/2011 | Park et al. | |
| 2011/0013087 A1 * | 1/2011 | House | A63B 24/0021 348/564 |
| 2011/0078591 A1 * | 3/2011 | van Os | G09G 3/003 715/756 |
| 2012/0327244 A1 * | 12/2012 | Pineau | H04N 7/181 348/158 |
| 2014/0007170 A1 * | 1/2014 | Klappert et al. | 725/97 |

* cited by examiner

FIG. 2

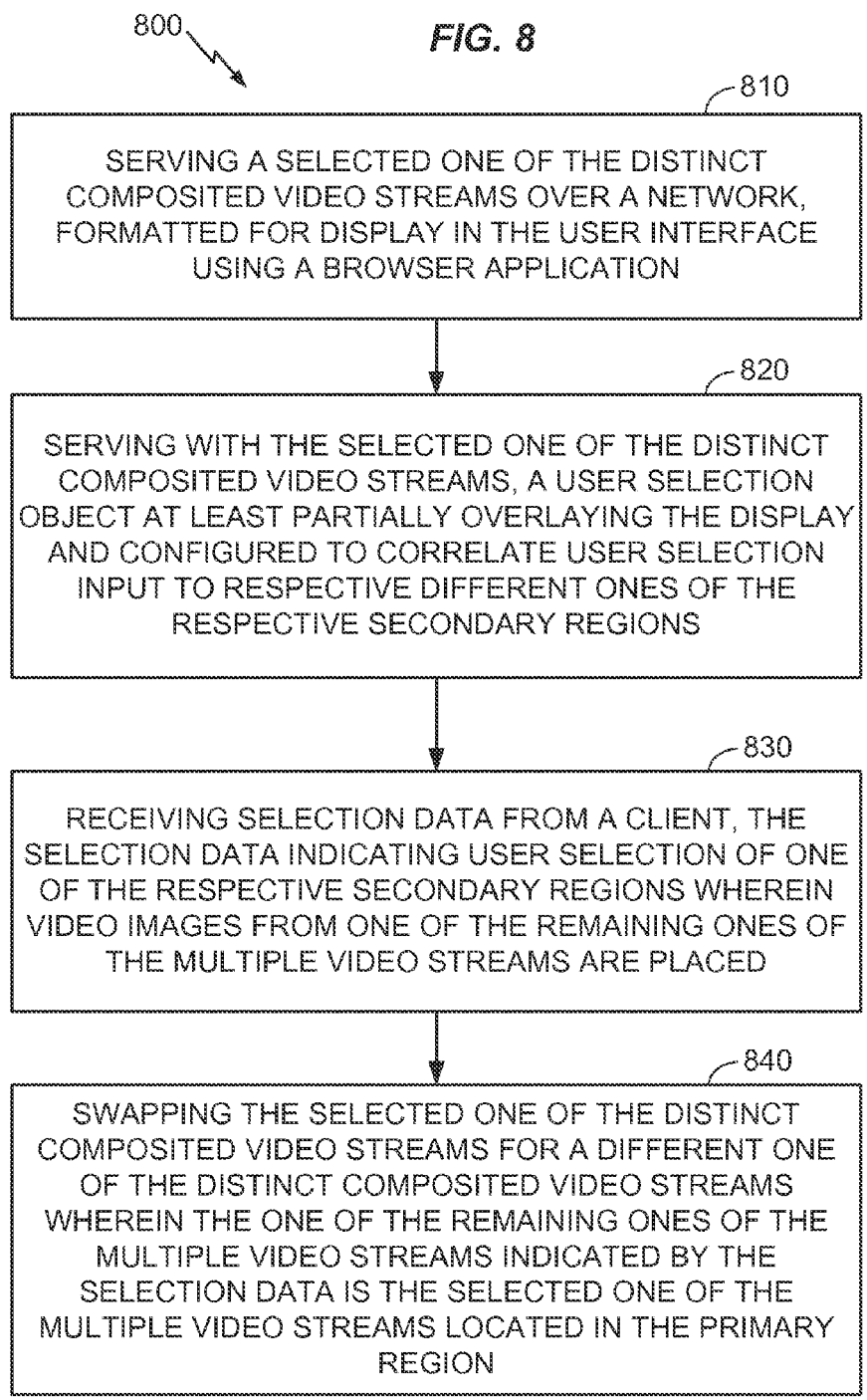

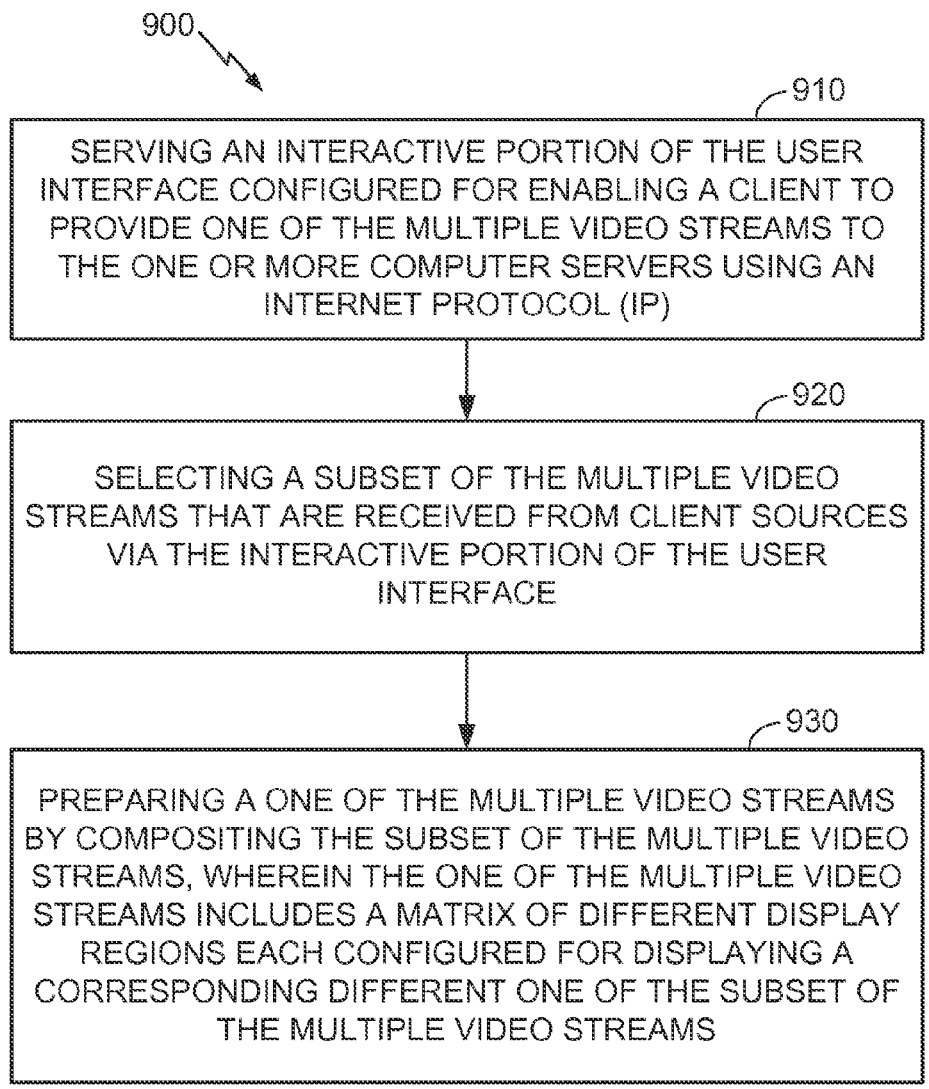

1010
SERVING A TEXT NEWSFEED IN A WINDOW OF THE USER INTERFACE WITH A WINDOW CONTAINING A DISPLAY OF THE MULTIPLE DISTINCT COMPOSITED VIDEO STREAMS

1020
SERVING A TEXT CHAT STREAM IN A WINDOW OF THE USER INTERFACE WITH A WINDOW CONTAINING A DISPLAY OF THE MULTIPLE DISTINCT COMPOSITED VIDEO STREAMS

1110
SERVING A SCHEDULE FOR PLANNED CONTENT PROGRAMS COMPRISING MULTIPLE DISTINCT COMPOSITED VIDEO STREAMS IN A WINDOW OF THE USER INTERFACE WITH A WINDOW CONTAINING A DISPLAY OF THE MULTIPLE DISTINCT COMPOSITED VIDEO STREAMS

1120
SERVING AN INTERACTIVE OBJECT FOR ACCESSING AN ARCHIVE OF PAST CONTENT PROGRAMS COMPRISING MULTIPLE DISTINCT COMPOSITED VIDEO STREAMS IN A WINDOW OF THE USER INTERFACE WITH A WINDOW CONTAINING A DISPLAY OF THE MULTIPLE DISTINCT COMPOSITED VIDEO STREAMS

FIG. 13D (Cont.)

SOCIAL MULTI-CAMERA INTERACTIVE LIVE ENGAGEMENT SYSTEM

CROSS-REFERENCE TO RELATED APPLICATION

The present application claims priority under 35 U.S.C. §119(e) to U.S. provisional patent application Ser. No. 61/904,413 filed Nov. 14, 2013, which application is incorporated herein in its entirety, by reference.

FIELD

This application relates to systems, methods and apparatus for compositing video and audio feeds in an interactive and/or social networking interface.

BACKGROUND

Interactive video and audio compositing and integration systems are known, for example on-line video conferencing, but limited in applications, capabilities and capacities. A need exists to reimagine audio/video compositing to enable new applications and capabilities for information sharing among various kinds of social groups.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for multi-camera interactive live engagement is provided, including receiving, at one or more computer servers, multiple video streams from distinct sources. The method may include preparing multiple distinct composited video streams from the multiple video streams. Each of the distinct composited video streams configures video images from a different selected one of the multiple video streams in a primary region and video images from remaining ones of the multiple video streams in respective secondary regions adjacent to the primary region. The method may include serving the multiple distinct composited video streams configured for presentation at different times in a user interface.

The effect of the novel systems and method present herein is to provide a complex, multi-window video interface to the end user that significantly enhances the user experience. At the same time, the complex multi-window video interface makes light use of client-side resources and may be utilized on thin clients without exceptionally high bandwidth as would otherwise be required to handle multiple simultaneous video streams. Back end, server side processing is use to push resource-intensive processing to the studio or source end, while handling video and audio inputs from multiple local and remote sources in parallel. The overall effect is to provide an exceptionally engaging novel user interface that is notable as being greater in impact than the sum of its parts. The novel interface may be useful for engaging members of a social group (e.g., a remote audience) in a broadcast live event, among other things.

Further aspects of the method may include serving a selected one of the distinct composited video streams over a network, formatted for display in the user interface using a browser application. A user selection object may be served with the selected one of the distinct composited video streams, configured to at least partially overlay the display and to correlate user selection input to respective different ones of the respective secondary regions. The method may further include receiving selection data from a client, the selection data indicating user selection of one of the respective secondary regions wherein video images from one of the remaining ones of the multiple video streams are placed. The method may further include swapping the selected one of the distinct composited video streams for a different one of the distinct composited video streams, wherein the one of the remaining ones of the multiple video streams indicated by the selection data is the selected one of the multiple video streams located in the primary region.

In another aspect, the method may include serving an interactive portion of the user interface, configured for enabling a client to provide one of the multiple video streams to the one or more computer servers using an Internet Protocol (IP). The method may include selecting a subset of the multiple video streams that are received from client sources via the interactive portion of the user interface. The method may further include preparing a one of the multiple video streams by compositing the subset of the multiple video streams, wherein the one of the multiple video streams includes a matrix of different display regions each configured for displaying a corresponding different one of the subset of the multiple video streams.

In related aspects, the method may include serving a text newsfeed in a window of the user interface with a window containing a display of the multiple distinct composited video streams. In addition, or in the alternative, the method may include serving a text chat stream in a window of the user interface with a window containing a display of the multiple distinct composited video streams. In addition, or in the alternative, the method may include serving a schedule for planned content programs comprising multiple distinct composited video streams in a window of the user interface with a window containing a display of the multiple distinct composited video streams. In addition, or in the alternative, the method may include serving an interactive object for accessing an archive of past content programs comprising multiple distinct composited video streams in a window of the user interface with a window containing a display of the multiple distinct composited video streams. In addition, or in the alternative, the method may include serving a schedule for planned competitive video game programs comprising multiple distinct composited video streams in a window of the user interface with a window containing a display of the multiple distinct composited video streams.

Systems and apparatus for performing the foregoing methods may include one or more processors coupled to a computer network, digital audio-video sources, and computer memory. The computer memory may hold encoded instructions, that when executed by the one or more processors, causes the system or apparatus to perform one or more of the operations of the method.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The present invention, in accordance with one or more various embodiments, is described in detail with reference to the following figures, in which like element numerals are used to indicate like elements appearing in one or more of the figures.

FIG. 5 is a sequence diagram showing an example of a use case including video feed by call in.

FIGS. 7-11 show aspects of methods for multi-camera interactive live engagement.

DETAILED DESCRIPTION

Figure 1:
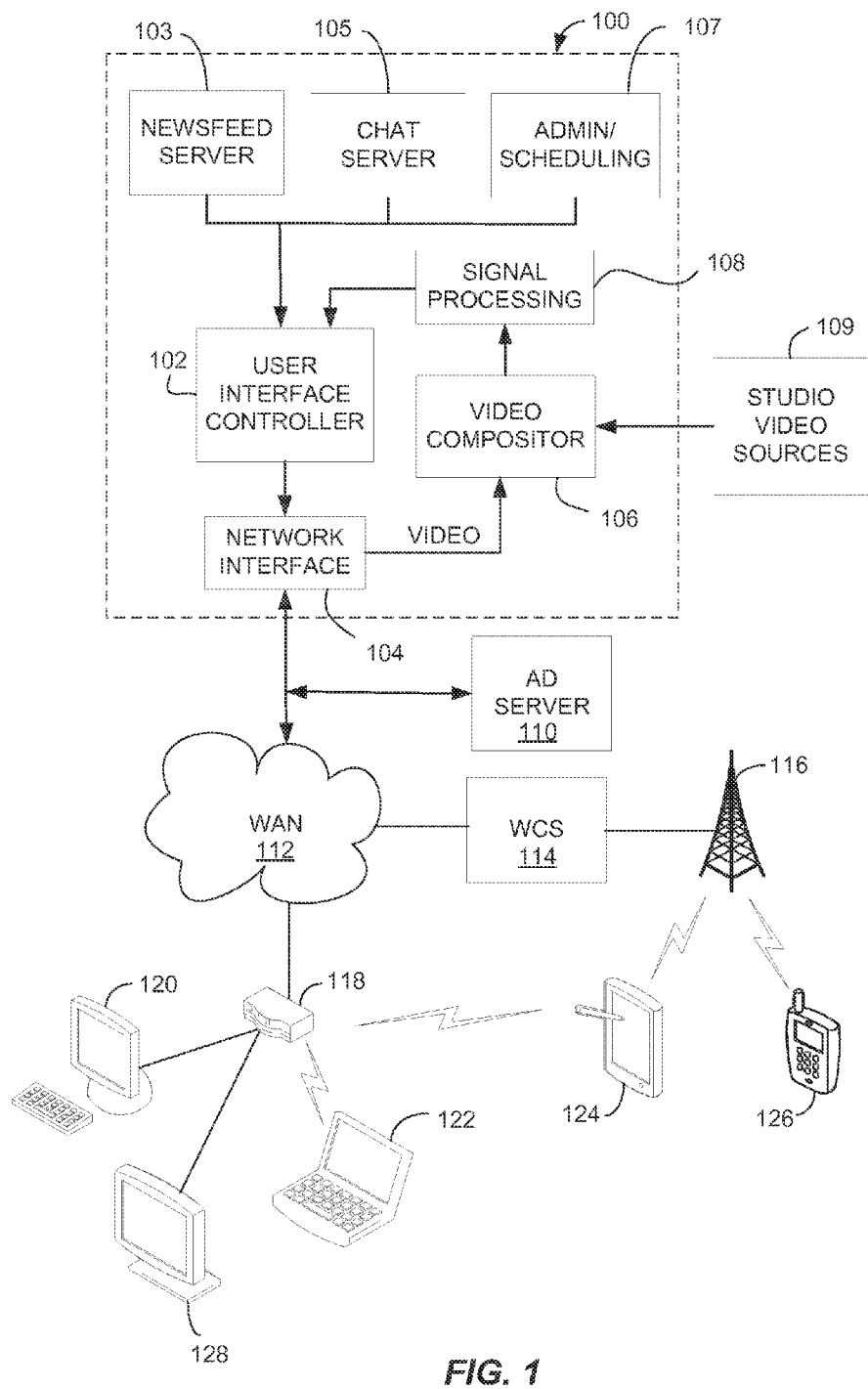
FIG. 1 is a block diagram showing a system for compositing video and audio feeds in an interactive and/or social networking interface, with certain external devices.

The present disclosure describes a technology to enhance user interactively and experience in conjunction with serving multi-camera audio/video feeds over an network, including a social multi-camera interactive live engagement (SMILE) system and methods of using the SMILE system. Features and aspects as disclosed herein may be implemented within a system including a SMILE system 100 in communication with multiple client devices via one or more communication networks. The SMILE system 100 may include one or more computer servers or modules 102, 103, 104, 105, 106, 107, and/or 102 distributed over one or more computers. Each server 102, 103, 104, 105, 106, 107, and/or 108 may include, or may be operatively coupled to, one or more data stores, for example databases, indexes, files, or other data structures, which may hold program data and/or instructions.

In general, the SMILE system 100 may operate on inputs, including streaming audio/video feeds from diverse remote sources 120, 128, 122, 124, or 126 (e.g., various types of cameras and microphones in carious client devices) and/or audio/video feeds from divers local sources 109, to prepare and serve a sophisticated graphical user interface (GUI) for presentation in a web browser or the like, including a specific arrangement of composited video feeds with interactive features as described in more detail herein below. The SMILE GUI may enable end users to simultaneously view all of the video feeds in at least two different resolutions, and easily swap video feeds of interest between a higher-resolution primary region of a SMILE GUI and lower-resolution secondary regions using a single selection action (e.g., mouse click or screen touch). The SMILE GUI may also enable end users to upload streaming video and audio to the SMILE server 100, using voice-over-Internet Protocol (IP) and video-over-IP protocol implemented in a smart phone, tablet computer, or other client, for example as provided by a Skype™ client application. Audio and video uploaded to the SMILE system 100 may be processed and incorporated into the SMILE output composited video feeds, and thereby appear in the user's client device after only a brief time lag (e.g., about 2 seconds or less). The amount of time lag may depend primarily on the speed and bandwidth of the network communication between the SMILE system 100 and each client device. The SMILE GUI is useful for presenting interactive events of various types, including, for example, call-in talk programs, video game competitions, game shows, news programs, hangouts, and interactive dramas. In connection with such programs, the SMILE GUI may include various supplemental features, including but not limited to news feeds, text chat windows, banner advertisements, and program guides or schedules. In addition, one or more of the input video feeds may include prerecorded video advertising inserted at selected intervals into a live feed.

To these and other ends, the SMILE system 100 may include a network interface component 104 handling bidirectional data flow between client devices and the SMILE system 100 via the network 112. The SMILE GUI may include pointers to external ads (e.g., static or video banner ads) that are selected and served by an independently operating ad server 110, or by multiple ad servers. In the alternative, or in addition, the SMILE system 100 may include advertising in data transmitted via the network interface 104.

The network interface 104 may receive uploaded audio/video streaming devices from any one or more of the client devices 120, 128, 122, 124, or 126, and provide received audio/video streams in real time to a real-time video compositor component 106. The video compositor component may also receive audio/video streams (sometimes referred to as "feeds") from local sources 109, via a local area network (LAN) or other connection. Studio feeds from the sources 109 may be hardwired into the video compositor, or may be received from the studio sources over a wide area network (WAN) or other network and assigned a special "studio" priority via any suitable authentication/security scheme. The video compositor 106 may automatically process (e.g., transcode) incoming feeds to one or more compatible audio/video streaming protocols, and automatically in real time create multiple, contemporaneous composited audio/video streams from the multiple input streams. For example, each incoming feed may be assigned a port or feed identifiers, and the compositor may produce each composited output stream based on a predetermined subset of the feed identifiers placed in a predetermined arrangement. Further details of the composited output streams are described herein below. The video compositor 106 may provide the output composite audio/video streams in parallel to signal processing module 108.

The signal processing module may perform operations such as transcoding, leveling, equalizing, color balancing, adjusting frame rates, frame sizes and/or resolution, to provide audio/video output in an optimal or usable form for respective different ones of the client devices 120, 128, 122, 124, or 126. For example, the signal processing module may receive multiple parallel streams of composited audio-video content in a high-resolution, high-frame rate format from the compositor 106 and prepare one or more sets of composited streams in lower-resolution or lower frame rate versions for resolution or bandwidth constrained client devices. Similarly, the signal processor may prepare different sets of composited streams in different formats for different media players, for example FLASH™ or HTML5 formats. Each different set of parallel audio/video streams may be provided to the user interface controller 102.

The user interface controller 102 may integrate data from various inputs into a unified SMILE GUI implemented as a dynamic web page or the like, for example an HTML or XML page, including extended functionalities such as JavaScript™ modules, and manage the serving of pages to different clients. The various inputs may include the parallel composited audio/video streams from the signal processing module 108 to appear in a video window of the SMILE GUI, continuously updated newsfeed data from a newsfeed server 103 to appear in a newsfeed window of the SMILE GUI, text chat stream data from a chat server 105 to appear in a chat window of the SMILE GUI, and program schedule and/or administrative announcements from a administrative/scheduling server 107 to appear in a program schedule window of the SMILE GUI. The user interface controller 102 may serve instances of the SMILE GUI to respective clients via the network interface 104, and manage audio, video, and data streams served to each client for output in the SMILE GUI. This may include, for example, at each particular point in time, selecting the correct one of the multiple composited video streams to serve to each client, in response to user feedback via the network interface 104.

The SMILE system 100 may include other components, for example, a video archive server (not shown) that may access a data store of various video segments; for example, archived video streams or video clips that may be used in production of live feeds. The video archive server may serve the video segments as directed by a user interface controller module 102. The SMILE system 100 may include other modules or units not depicted in FIG. 1, for example diagnostic servers, commerce servers, network infrastructure, advertising selection engines, and so forth. A more detailed description of an example of a SMILE system is provided below, in connection with FIG. 4. The present technology is not limited to the examples described herein, and one of ordinary skill may design alternative systems for providing the innovative SMILE GUI and features described herein.

The SMILE system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the SMILE system 100, via the data communication network 116 and/or other network 114. Such client devices may include, for example, one or more laptop computers 122, desktop computers 120, "smart" mobile phones 126, notepad devices 124, network-enabled televisions 128, or combinations thereof. Each of the client devices may be communicatively coupled to the SMILE system 100 via a router 118 for a LAN, via a base station 116 for a wireless telephony network 114, or via some other connection. In operation, such client devices 120, 122, 124, 126, 128 may send and receive data or instructions to the system 100, including bidirectional audio/video streaming data, in response to user input received from user input devices or other input. In response, the system 100 may serve selected composited video streams and customized additional content in a SMILE GUI to the client devices 120, 122, 124, 126, 128. The devices 120, 122, 124, 126, 128 may output video and game content from the SMILE GUI using a display screen, projector, or other video output device. In certain embodiments, the system 100 configured in accordance with the features and aspects disclosed herein may be configured to operate within or support a cloud computing environment. For example, a portion of, or all of, the servers 102, 104 or 110 may reside in a cloud server.

In general terms, each of the client devices 120, 122, 124, 126, 128 and one or more modules of the SMILE system 100 shown in FIG. 1 may be configured as or include features common to computing device, whether client or server. For example, each computing device may include a processor operatively coupled to a computer memory, which holds binary-coded functional modules for execution by the processor. Such functional modules may include an operating system for handling system functions such as input/output and memory access, a browser (e.g., Windows™ Explorer™, Mozilla™ Firefox™, Google™ Chrome™ or the like) for accessing information via the World Wide Web or similar network infrastructure, and a media player for playing streaming video and communicating with a streaming video system (e.g., Adobe™ FLASH™ of Shockwave™ player, HTML5 video player, or other audio/video playing application).

A bus or other communication component may support communication of information within the computing device. The processor may be a specialized or dedicated microprocessor configured to perform particular tasks in accordance with the features and aspects disclosed herein by executing machine-readable software code defining the particular tasks. Processor memory (e.g., random access memory (RAM) or other dynamic storage device) may be connected to the bus or directly to the processor, and store information and instructions to be executed by a processor. The memory may also store temporary variables or other intermediate information during execution of such instructions.

A computer-readable medium in a storage device may be connected to the bus and store static information and instructions for the processor; for example, the storage device may store application modules (e.g., browser, etc.) when the computing device is powered off, from which the modules may be loaded into the processor memory when the client is powered up. The storage device may include a non-transitory computer-readable medium holding information, instructions, or some combination thereof, for example instructions that when executed by the processor, cause the computing device to perform one or more operations of a method as described herein.

A communication interface may also be connected to the bus. The communication interface may provide or support two-way data communication between the computing device and one or more external devices, e.g., the SMILE system 100, optionally via a router/modem and a wired or wireless connection. In the alternative, or in addition, the computing device may include a transceiver connected to an antenna, through which the device may communicate wirelessly with a base station for a wireless communication system or with the router/modem.

The computing device may be connected (e.g., via the bus and a graphics processing unit) to a display component. A display component may include any suitable configuration for displaying information to a user of the client device. For example, a display component may include or utilize a cathode ray tube (CRT), liquid crystal display (LCD), touchscreen LCD (e.g., capacitive display), light emitting diode (LED) display, projector, or other display device to present information to a user of the computing device in a visual display.

One or more input devices (e.g., an alphanumeric keyboard, microphone, keypad, remote controller, game controller, camera or camera array) may be connected to the bus via a user input port to communicate information and commands to the computing device. In selected embodiments, an input device may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit, for example using a touch sensitive screen. A cursor control device may communicate direction information and command selections to the processor and control cursor movement on the display. A cursor control device may have two or more degrees of freedom, for example allowing the device to specify cursor positions in a plane or three-dimensional space.

The computing device may be used to transmit, receive, display, or otherwise process one or more video streams in the SMILE GUI. In selected embodiments, such transmitting, receiving, and displaying may be in response to the processor executing one or more sequences of one or more instructions contained in a CPU main memory. Such instructions may be read into the main memory from another non-transitory computer-readable medium (e.g., a data storage device). Execution of sequences of instructions contained in main memory may cause a processor to perform one or more of the procedures or steps described herein. In selected embodiments, one or more processors in a multi-processing arrangement may also be employed to execute sequences of instructions contained in main memory. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

The term "non-transitory computer-readable medium" as used herein may refer to any medium that participates in holding instructions for execution by a computer processor, or that stores data for processing by a computer. Such a medium may take many forms, including but not limited to, non-volatile media, volatile media, and temporary storage media (e.g., cache memory). Non-volatile media may include optical or magnetic disks, such as found in storage devices. Volatile media may include dynamic memory, such as a CPU main memory. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

Figure 2:
FIG. 2 is a screenshot showing an example of a user interface for providing to a client device for display and interaction with composited video and audio feeds.
Figure 2:
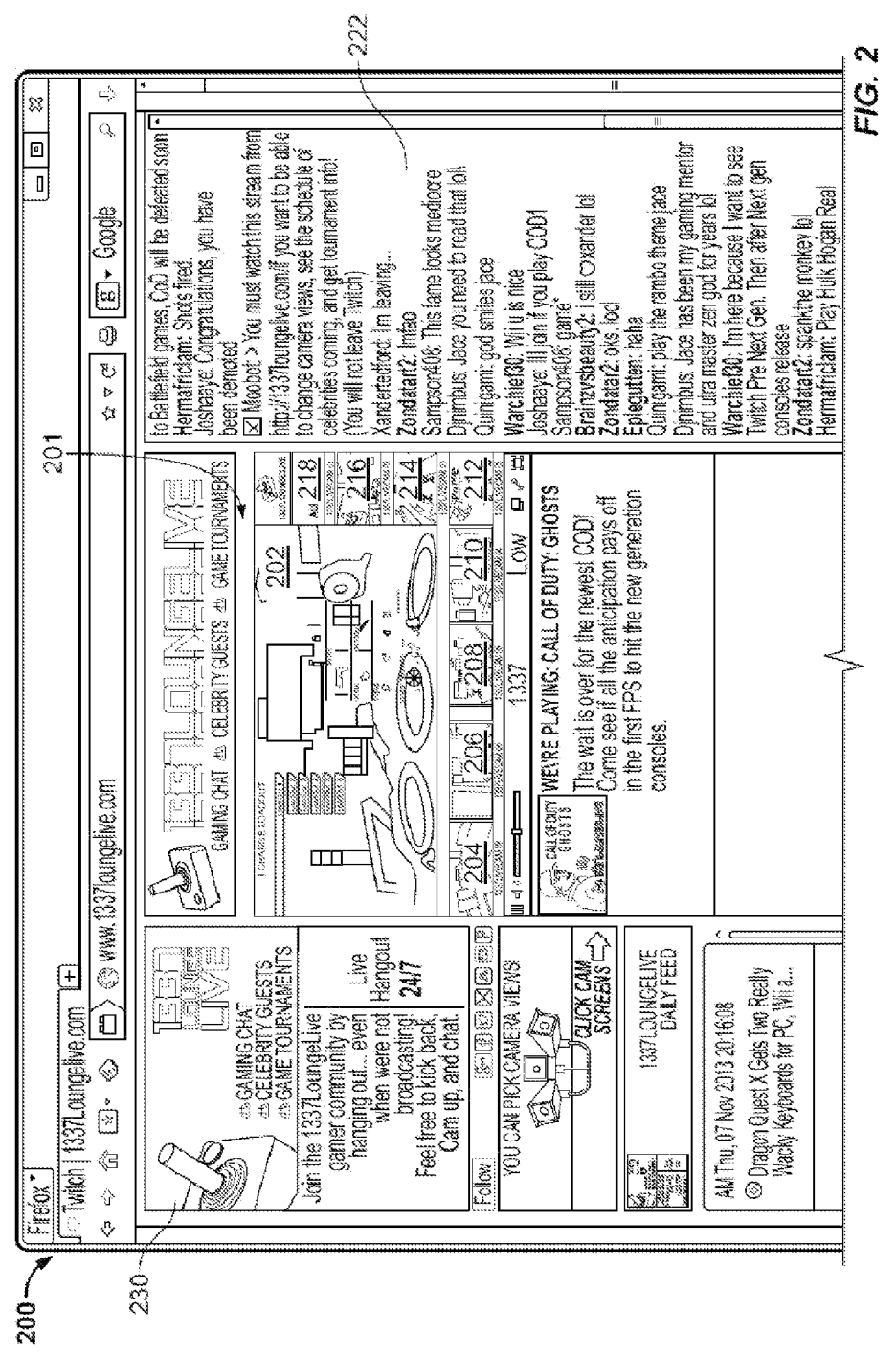

The SMILE GUI displays the utility of the innovative video and audio processing supplied by the SMILE System described herein. Aspects of the SMILE GUI may be understood with reference to an example window 200 shown in FIG. 2, showing an instance of the SMILE GUI at an instant of time as it may appear in a web browser application. Different regions of the window 201 may be arranged as illustrated using any suitable language or module compatible with the browser application, for example, hypertext mark-up language (HTML) and extensions thereof. The window 200 may include a video region 201, comprising a primary region 202 and secondary regions 204, 206, 208, 210, 212, 214, 216, and 218. Other arrangements and numbers of primary and secondary regions may also be used. The primary region 202 may be substantially larger in area than each individual secondary region, for example, 10 to 30 times larger, or about 12 to 20 times larger.

In an aspect, although each of the primary region 202 and secondary regions 204, 206, 208, 210, 212, 214, 216, and 218 appears to display independent video feeds, in actuality, a single composited video stream may supply all of the video appearing in the video region 201. The single composited video stream may be one of a set of related composited video streams prepared by the SMILE system 100, which may change in response to user input. Independently operating, transparent interactive objects for user selection may overlay each of the secondary regions 204, 206, 208, 210, 212, 214, 216, and 218, and/or other areas of the video region 201. When selected by user input (e.g., a mouse click or screen touch) each object may send a signal to the SMILE system, indicating a user request to view the video stream appearing underneath the transparent selection object in the primary region 202.

For example, in response to user selection of a transparent button over the left-most secondary region 204, the interactive object transmits a signal to the SMILE system 100 via the client device on which the window 200 is open, indicating an identifier of the client device or session and the secondary region 204. In response, the SMILE system may determine the identity of the video stream in region 204, based on the identity of the current composite video stream that the SMILE system is serving to the identified client or session in window 200 and on the algorithm used to automatically produce the current composite video stream from the input video streams. Once the video stream in region 204 is identified, the SMILE system may identify a different one of the composite video streams in which the video stream in region 204 appears instead in the primary window 202 and optionally, the video located in the primary region 202 is located in one of the secondary regions, e.g., region 204. Once the new composite video steam is identified, the SMILE system may serve it to the client device to appear in the video region 201. To the end user, the apparent effect is that by selecting the video in region 204, the user causes video in the secondary region 204 to be swapped or exchanged for the video in the primary region 202. Thus, the user can easily control which of the videos appearing in the video region 201 appears in the primary region 202. This enables the viewer to watch all video streams in the video region 201 simultaneously, while selectively placing the video stream of greatest interest at any particular time in the primary region 202.

An important aspect of the SMILE GUI may include a video hangout feed in which multiple (e.g., 9) uploaded audio/video streams are composited into one of the input video feeds, which is then composited again into the set of output composited video stream. This composited hangout feed appears in region 206 of video region 201, and at a larger size in the primary region 302 of video region 301 in pop out window 300 shown in FIG. 3. Referring again to FIG. 2, call buttons 220 may be used to initiate an uploading streaming session for including in a hangout stream. Activating a button may open, for example, a Skype™ or similar Video-over-IP session with the SMILE server 100, using a user-operated client device equipped with a camera and microphone. Once composited, the hangout feed may be operated like any other feed appearing in the video region 201. A limited number of upload sessions (e.g., 9) may simultaneously operate for the hangout feed. One the limit is reached, the call buttons 220 may no longer be operable, because the SMILE server may not accept any additional upload streaming video session exceeding the designated limit.

The window 200 may include other regions for enhancing the user experience and enjoyment of the video content in region 201. For example, the window 200 may include a newsfeed region 232, displaying a scrolling feed of news items selected by the SMILE system for the specific user profile identified with the client session, or for a generic user if no user profile is available. For further example, the window 200 may include a text chat region 222, displaying a scrolling feed of text chat provided by users logged into a chat session which may be initiated via a chat button 223. The window 200 may also include a schedule region 224 displaying dates and times of programs or shows scheduled to appear in the video region 201. The window 200 may include other objects, for example a tab or link 226 to archived video programs that may be viewed in the video region 201, and/or a tab or link 228 to game tournament information, useful for accompanying embodiments wherein competitive video gaming is provided as program content. The window 200 may include conventional elements, for example a banner ad region 230 for advertising or notices.

Figure 3:
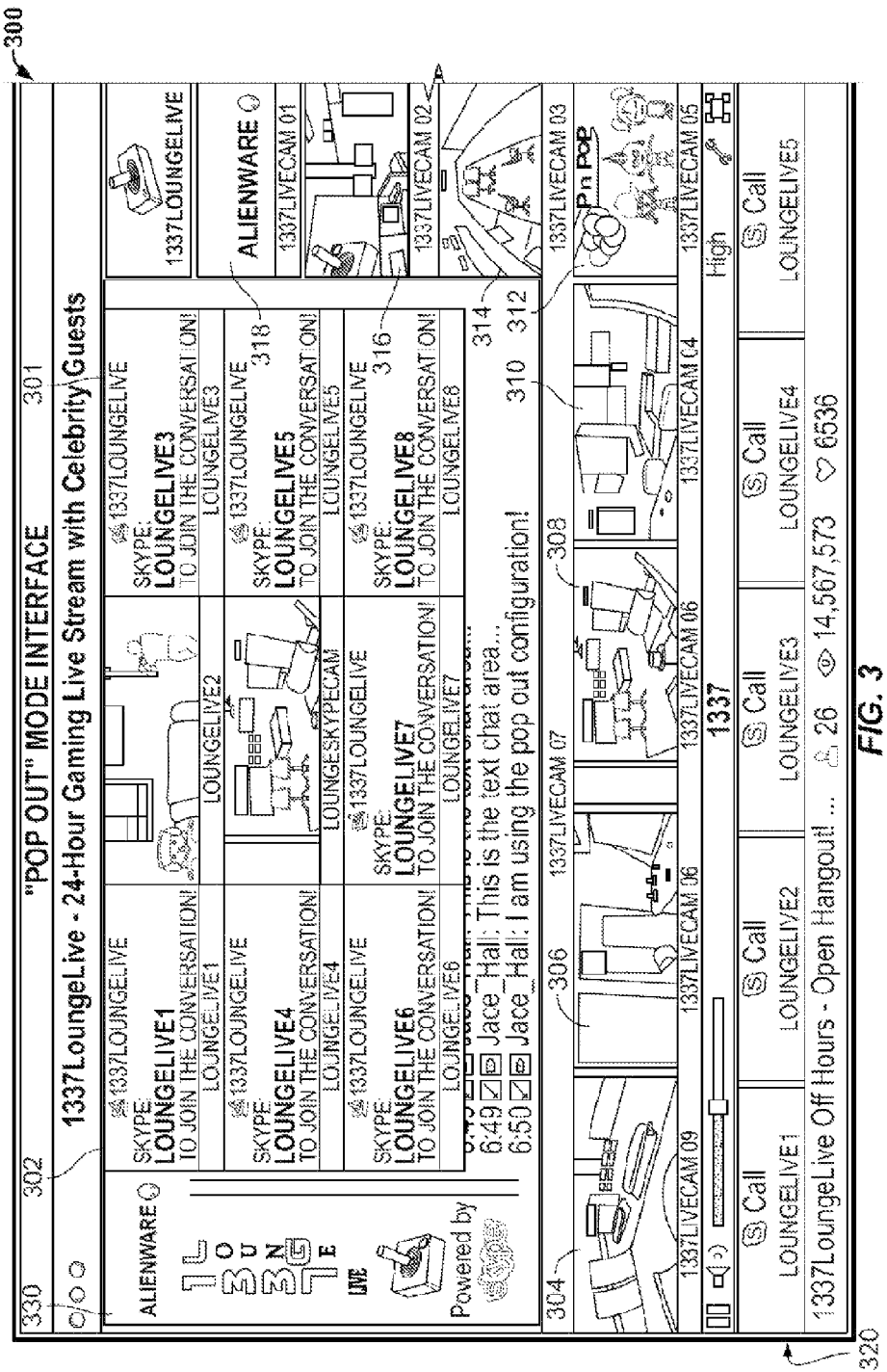
FIG. 3 is a screenshot showing an example of a simplified user interface for providing to a client device for display and interaction with composited video and audio feeds.
Figure 3:
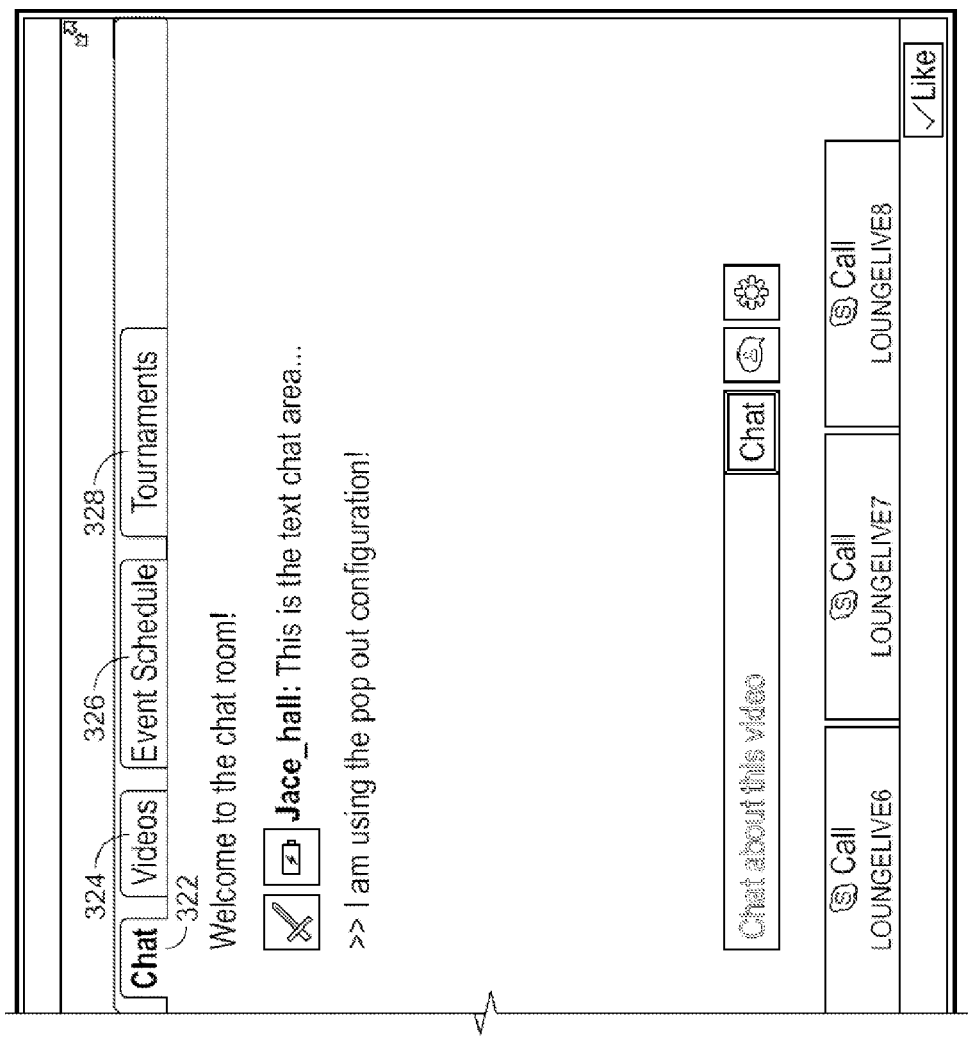

FIG. 3 shows an example of a pop out mode interface window 300, which includes a subset of the different regions described above for window 200. The pop out window 300 includes a fully functional video region 301 with a primary region 302, and secondary regions 304, 306, 308, 310, 312, 314, 316 and 318. A hangout composited feed appears in the primary region 302, at the illustrated instant of time, showing video uploaded from two remote clients; the remaining hangout slots are empty at the illustrated time, and thus the system is capable of accepting seven additional uploaded streams at that time. The video region 301 may operate the same as the region 201 described above. The pop out window 300 may include call-in video activations buttons 320 like buttons 220 in window 200. Other similar features may include an ad banner 330, chat region 322, video archive link 324, schedule link 326 and tournaments link 328.

Figure 4:
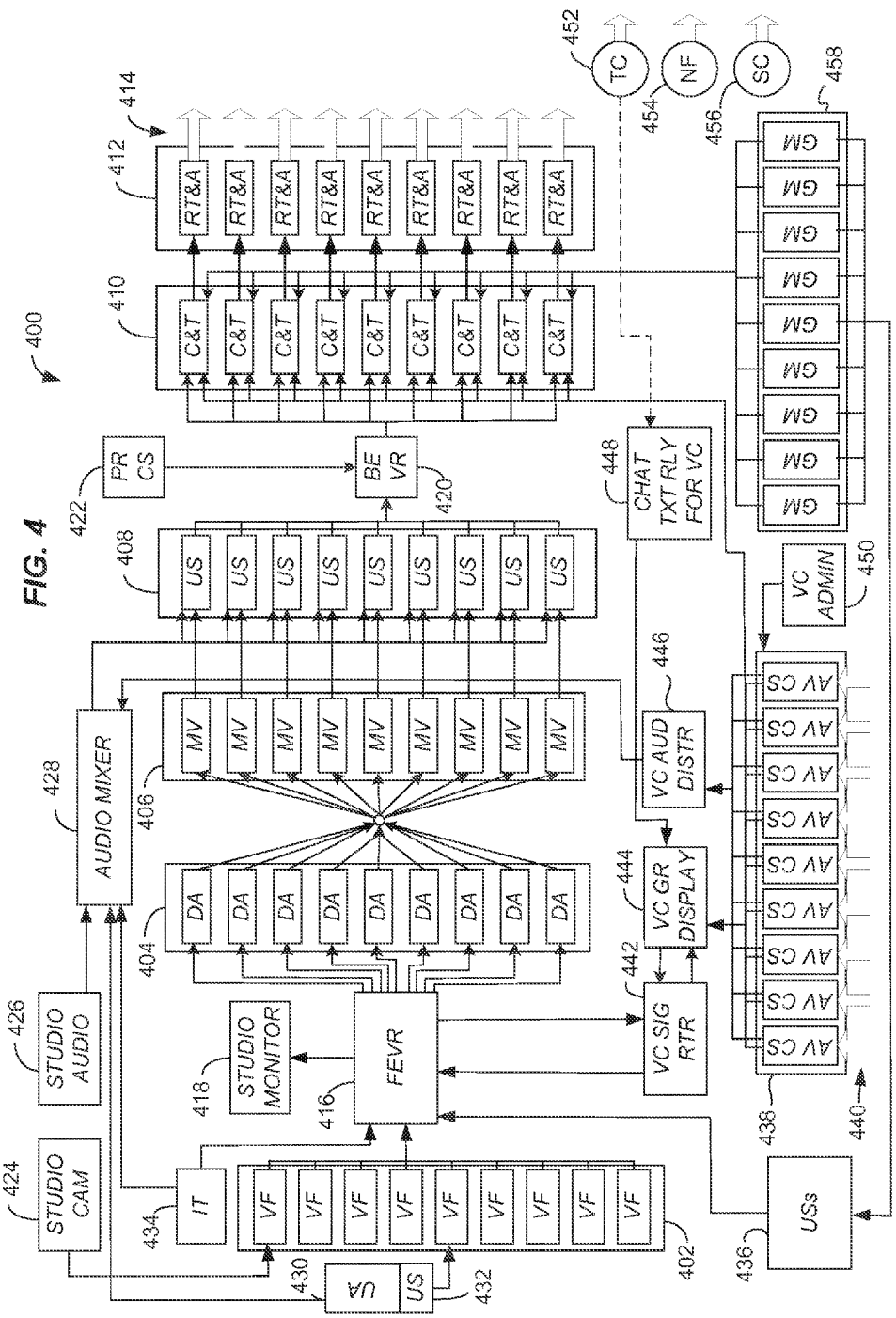
FIG. 4 is a block diagram showing an example of a system for compositing video and audio feeds in an interactive and/or social networking interface.
Figure 5:
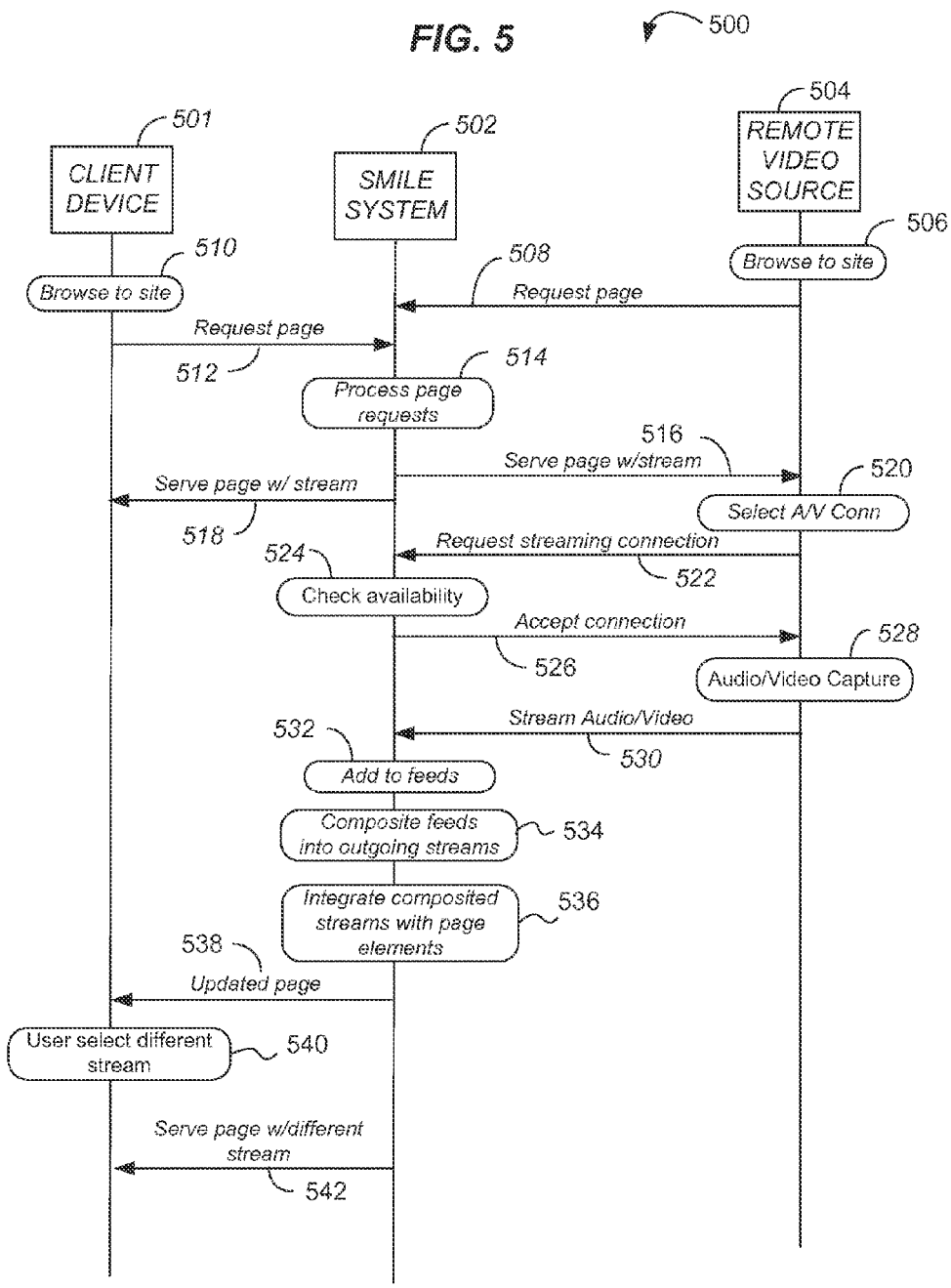

A more detailed example of a SMILE system 400 is illustrated in FIG. 4. The SMILE system has been conceptually designed to accommodate an unlimited number of video sources. These sources are then grouped together as an array however they are individually connected to a multi-input electronically controlled video hub. Ten video feeds 402 are illustrated, but this number may be scaled up or down as desired.

A universal scaler 432 may be incorporated before one or several of the SMILE system video feeds 402 to normalize the signal and accommodate any rapid changes of source input signal resolution or frequency. In one embodiment, one of the video feeds 402 is video output of a computer based universal arcade machine 430 emulating several different historic video game platforms which each has their own unique resolutions that can be initiated at any time. Another video feed may be supplied from a studio camera 424; any desired number of studio cameras may be used to supply one of the video feeds, up to the number of available feeds. Similarly, studio audio capture 426 may be supplied from one or more microphones or the like.

All video input that is intended to be included into the user selectable interactive portion of the SMILE system presentation and experience may pass through the primary front end video routing hub 416. System Control Decisions by the operator regarding how many and which video input feeds are sent to the Signal Replication Array are made during this stage of the signal flow process, via the hub 416.

Using a distribution amplifier, each independent video feed from the (front end video routing hub 416 may replicated by (X) times, wherein (X) is the total number of video feeds that the SMILE system operator intends to appear inside the final matrix composition, referred to elsewhere herein as a set of composite video feeds for a SMILE GUI. For each signal set of (X) being sent from each of the distribution amplifiers 404, a corresponding one of the DVI/VGA/HDMI/3G/HD/Composite/YPbPr/YC/HD-SDI/SD-SDI capable multiviewers 406 is used to receive each set for multi signal aggregation, layout and single channel compositing. The multiple video feeds, now arranged into a single layout and channel from each of the multiviewers 406 may then be routed for resolution and frequency adjustment by a corresponding set of universal scalers 408. Each of the distribution amplifiers 404 distributes its output video stream to each and every one of the multiviewers 406. Thus, each of the multiviewers 406 receives all of the available front end video feeds 402.

At the universal scalers 408, each final matrix composition single channel is independently received and converted to the preferred uncompressed resolution and frequency of the SMILE system operator. Final audio intended to be broadcast across all streams equally may be received from a complete audio mixer 428 to broadcast and incorporated at the universal scalers 408.

Signals are received for the SMILE system operator control regarding the corresponding routing arrangement of specific video feeds to match the corresponding final user controllable interactive destination interface. Back end video router 420 may also used to disrupt the interactive video feed entirely and switch the entire multi-camera broadcast to display the video feed of the pre-recorded content system 422. The pre-recorded content system 422 may be linked to the SMILE GUI via an archive tab, illustrated in FIGS. 2 and 3. This server and system 422 may contain all desired prerecorded content that the SMILE system operators want to display in a non-multi-view format. Content playback and programming may be playlist oriented and driven by custom schedule control software.

Transmission finalization and distribution to content distribution network (CDN) for each final matrix composition single channel may be independently performed downstream of the back end video router 420. This may include converting to the preferred compressed resolution and frequency of the SMILE system operator at compression and transmission modules 410, and transmitted via internet to the CDN service provider operating corresponding receive/transmit and archive modules 412. Software supporting additional video composition and audio can be overlaid and added if desired at the CDN modules 412. Separate composited video streams 412 (final matrix compositions) may be served from the CDN modules 412 as requested by client devices.

In another aspect, both video caller array 438 and high end PC gaming system 458 may output independent audio signals and video signals. These signals are received and optionally available in the composited audio and video feeds, as well. Multiple independent compressed streams representing all selectable video viewpoints are produced at this stage and then sent to CND large scale redistribution at 412.

The SMILE system was designed to leverage pre-existing CDN technology. A standard issue separate account may be created at the CDN for each individual video stream to be received then transcoded, archived and rebroadcast back to the SMILE system stream switching destination software interface, also referred to herein as the SMILE GUI, an example of which is shown above in window 300 of FIG. 3. The CDN bears the burden of bandwidth, not the SMILE system.

The stream switching destination software interface may be custom software supporting multiple platforms that provide the total user experience and bind all elements of the SMILE system together. It may be an intuitive user controllable interface that allows for: seamless switching of incoming multi-feed streams, simple activation/connection of a video call, user registration, account management, text chat, event programming guide, newsfeed ticker, in stream clickable ad system display, out-of-stream ad system display, tournament facilitation, contest facilitation, and direct access to the video archive of past live broadcasts. The complete integration constitutes a unique look and feel as well as establishing a new way of doing things from a user's perspective.

The video caller array 438 may include a specific set of computers that handle the reception and back/forth transmission of multiple independent incoming video calls 440. Each computer in the array replicates the video and audio of transmissions received/sent and routes those independent replications to video call signal routing 442, video caller group display 444 and video caller audio distribution 446. Additionally each independent video call audio stream may also be routed to transmission finalization and distribution modules 410 upstream of CDN modules 412 for optional layering and compositing into the final outgoing signal.

The video call signal router 442 may be configured to aggregate all independent video call and audio signal is aggregated for decision and control by the SMILE system operator. Additionally, the video caller group display 444 is received, comprising the composited video caller matrix feed. Final output of video call signal router 442 may be directed to the front end video routing 416 for possible inclusion into the signal replication system 404 (including multiple distribution amplifiers) and final broadcast.

All independent video calls 440 and total mixed caller audio signal is aggregated for SMILE system operator's dynamically designed display configuration matrix at the video caller group display 444. Live feed of the stream switching destination software interface's (FIG. 3 at 300) text chat system 452 may also added to the display matrix via the chat text relay for video caller 448. The final aggregate display may then be output to video call signal routing 442 and also back to the video caller array 438 for live display on the remote video callers client software.

Video caller audio distribution 446 of independent video caller audio may include receiving audio streams from video caller array 438 and complete audio mix to broadcast 428. Audio is mixed, processed, leveled and then sent to video caller group display 444 and also relayed back to complete audio mix to broadcast 438 with the added video caller audio signal. Video caller administration 450 including a control computer and system program may be used to remotely manage all computers in the video caller array 438. Additionally, user moderation functions may be handled here for video callers specifically.

The chat text relay for video caller module 448 may include computer capture system that accesses the stream switching destination software interface's text chat system, captures it, and then sends that video output to video caller group display 444 for inclusion into the video caller array 438 transmission to caller signal as well as to video signal call routing 442 for eventual routing to environment/studio location display 418. The display 418 may be whatever video display array the SMILE system operator has set up in the on-location environment.

A studio location multi-channel audio feed 426 may include multiple microphones or audio feeds from non-video and video sources that are located at the physical location of the smile system that the operator intends to be part of the SMILE broadcast. each independent audio feed may be sent to the complete audio mix to broadcast 428 for aggregation, leveling and inclusion into final broadcast.

The complete audio mix to broadcast module 428 may receive all cumulative audio intended to reach final broadcast unilaterally across all independently broadcasted streams. This may include the studio location multi-channel audio feed 426, video caller audio distribution 446 and other ancillary systems such as the instant touchscreen video playback hype machine 434 that is found in video feeds 402.

The high end PC gaming systems module 458 may provide output video sent to resolution and frequency adjustment at universal scalers 436 for eventual delivery to front end video routing 416 and follow on signal replication by distribution amplifiers at 404. Audio may be directly routed to transmission finalization and distribution to CDN 410, bypassing complete audio mix to broadcast module 428. Output from each high end pc gaming system may be independently received and converted to the preferred uncompressed resolution and frequency of the smile system operator for eventual destination to front end video routing 416 and follow on signal replication at the distribution amplifiers array 404. The system 400 may include an independent newsfeed system 454, program scheduling system 456, and other systems not shown.

Aspects of the SMILE system may be illustrated by the use case 500, showing an example of a sequence for uploading a video stream and updating a composite video feed with the uploaded stream, involving the SMILE system 502 and two client devices 501 and 502, wherein the client device 502 includes a video stream source. At 506 and 510, respectively, the devices 504 and 501 may browse to a site where a SMILE GUI is hosted, and at 508 an 512, respectively, request a page from a system host. At 514, the SMILE system 100 processes the page requests, at 516 serves an initial page with video stream to the video client 504, and at 518, serves an initial page with video stream to the viewing client 501. The initial page may include interactive objects (e.g., buttons) for initiating a video-over-IP streaming session uploading a video stream to the SMILE system 502. A user may select 520 one of these buttons, causing the client 504 to transmit a request 522 for a streaming connection to the SMILE system 502.

At 524, the SMILE system 502 checks availability for a new upload streaming session. If the SMILE system is able to accept another upload session (e.g., it is not limited out), it may transmit 526 connection accept message to the client 504, triggering audio/video capture at the client 504. The client 504 may begin to stream 530 captured video to the SMILE system 502. At 532, the SMILE system adds the stream 530 to the inputs for upload feeds, for example compositing with other uploaded streams to prepare a group feed, and then compositing the group feed with other video feeds to prepare a final set of composited feeds. Composited audio/video feeds may be automatically integrated with page (SMILE GUI) elements at 536 by streaming the updated feed 538 to viewing client 501. At 540, the user may select 540 a different stream, for example by selecting an interactive object over a secondary video region, causing the client to transmit a request (not shown) for a different composited video to the SMILE system 502. At 542, the SMILE system 502 may transmit the requested, different composited video feed to the client 501. Video streaming 530 may continue during this time.

Figure 6:
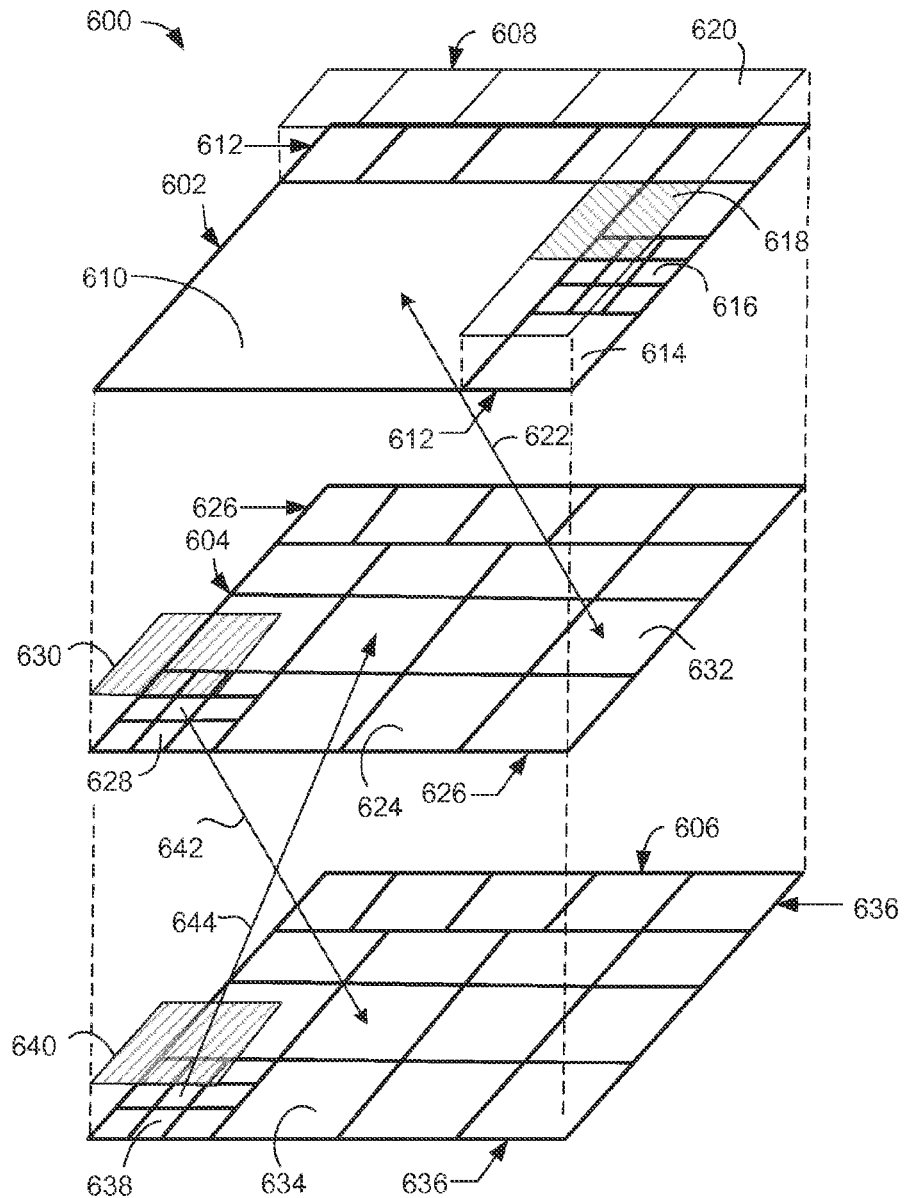
FIG. 6 is a concept diagram showing aspects of a user interface including different composited video streams.

Aspects of a SMILE GUI and system are further illustrated by FIG. 6, showing a concept diagram of nested composited video feeds 600 in a GUI. An initial composite video feed 602 may include a sequence of video images located in the primary region 610 and different video images in the secondary regions 612, for example, secondary region 614 containing a single video and region 616 containing a group of composited videos. A transparent interactive mask 608 including independently operable objects (e.g., objects 618 and 620) may be overlain over the secondary video regions 612. The highlighted object 618 indicates user selection of the underlying secondary region 616 holding the composited group video feed 616. This user selection may trigger provision of a second composite video feed 604 through the mechanisms discussed above.

In some embodiments, the second composite video feed 604 is configured the same as the first, with the overlain selection mask 608. This mask is not drawn again, for illustrative simplicity, but may nonetheless overlay the secondary regions 626 and operate similarly as described for the first video feed 602. The images appearing in the primary region 610 of feed 602 may be swapped into the secondary region 632 of composited video feed 604 as indicated by the arrow 622, while the group feed in the secondary region 616 of feed 602 is swapped into the primary video region 624 of feed 604. At this time, activation of the selection object 618 would cause the first video feed 602 to be requested and re-served, effectively swapping the images in secondary region 632 of the second feed 604 back into the primary region 610 of the first feed 602.

In some embodiments, for example when the primary region 624 includes different regions corresponding to each member of a group feed, a portion 628 of the primary window 624 may be overlain by an interactive selection object 630. The portion 628 may contain another, lower level iterated group composite feed. At the SMILE system, this may be provided by compositing a set of input feeds into a group feed, and then inputting the group feed into a compositing process for a second group feed. User selection of the object 630 may cause the client to send a request for the third composited video feed 606, in which the group feed in secondary region 628 is swapped into the primary region 634, as indicated by the arrow 642, while the group feed in the primary region 624 is swapped into the secondary region 638.

In the third level composited video feed 606, selection of the object 640 may swap back the group feed in the corner portion 638 of composited feed 606 back to the primary region 624 of composited feed 604. Likewise, the group feed in the primary region 634 of the third composited feed 606 may be swapped back into the corner portion 628 of the second corn posited feed 604. These swaps are apparent only, as the actual process initiated by selection of the objects 630 or 640 is merely the substitution of the second feed 604 for the third feed 606, or vice-versa. Nonetheless, the nested video feeds 600 illustrate how a large number video feeds may be accessed via a relatively compact video region, though the use of layered compositing. Meanwhile, each client using the user interface 600 receives only a single video feed at a time, reducing client resource demands and network bandwidth requirements.

Figure 7:
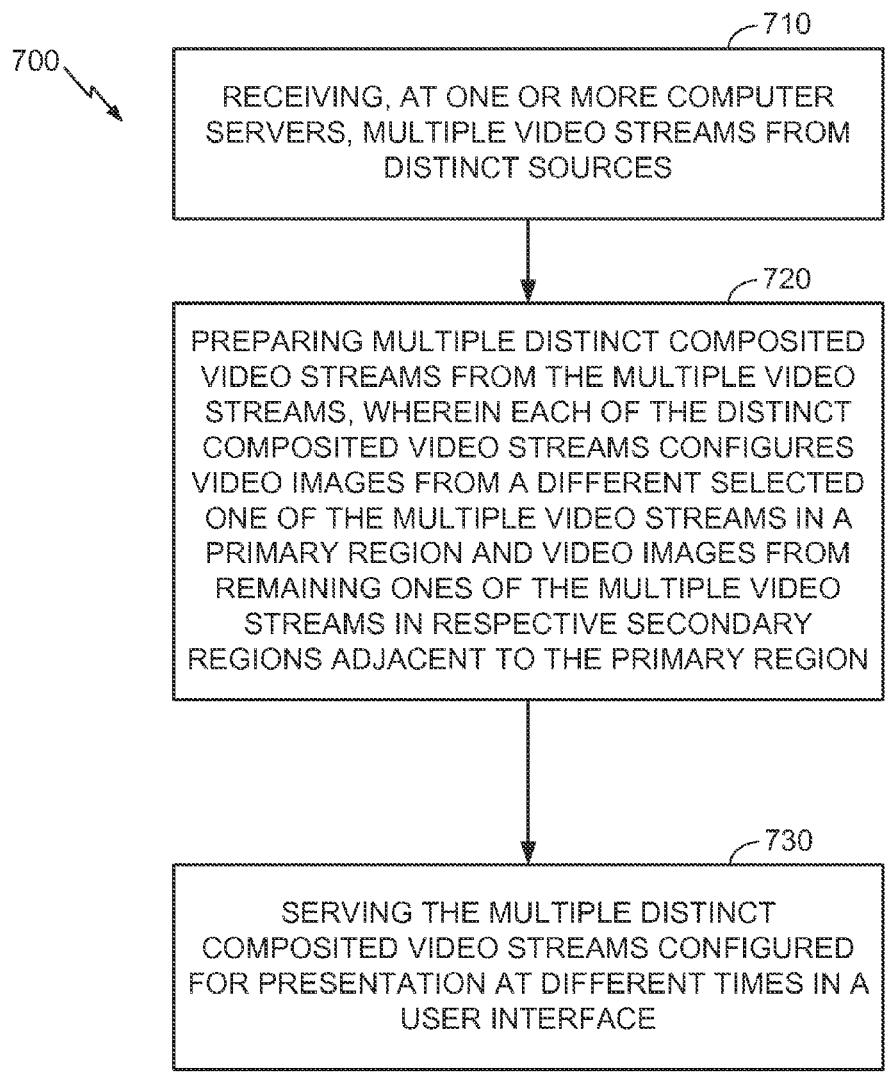

Referring to FIG. 7, aspects of a method 700 for multi-camera interactive live engagement are illustrated. At 702, the method may include receiving, at one or more computer servers, multiple video streams from distinct sources. For example, a SMILE system may receive video feeds from in-studio cameras and remote call-in video clients. The method 704 may further include, at 704, preparing multiple distinct composited video streams from the multiple video streams, wherein each of the distinct composited video streams configures video images from a different selected one of the multiple video streams in a primary region and video images from remaining ones of the multiple video streams in respective secondary regions adjacent to the primary region. More detailed aspects of this compositing process may be as described above in connection with FIGS. 1-6. The method 700 may further include, at 706, serving the multiple distinct composited video streams configured for presentation at different times in a user interface. The different times may be determined by user selection actions via a SMILE GUI, selecting which of the composited feeds is displayed in a video region.

The method 700 may include any of the more detailed aspects described above in connection with FIGS. 1-6, some of which are summarized below in connection with FIGS. 8-11. FIGS. 8-11 illustrate additional aspects and operations 800, 900, 1000 or 1100 that may be practiced in conjunction with method 700. The operations shown in FIGS. 8-11 are not required to perform the method 700. Operations 800, 900, 1000 or 1100 are independently performed and not mutually exclusive. Therefore any one of such operations may be performed regardless of whether another downstream or upstream operation is performed. If the method 700 includes at least one operation of FIGS. 8-11, then the method 700 may terminate after the at least one operation, without necessarily having to include any subsequent downstream operation(s) that may be illustrated.

Referring to FIG. 8, the method 700 may include one or more of the additional operations 800 regarding user selection of composite video feeds. The method 700 may include, at 810, serving a selected one of the distinct composited video streams over a network, formatted for display in the user interface using a browser application. The method 700 may further include, at 820, serving with the selected one of the distinct composited video streams, a user selection object at least partially overlaying the display and configured to correlate user selection input to respective different ones of the respective secondary regions. The method 700 may further include, at 830, receiving selection data from a client, the selection data indicating user selection of one of the respective secondary regions wherein video images from one of the remaining ones of the multiple video streams are placed. The method 700 may further include, at 840, swapping the selected one of the distinct composited video streams for a different one of the distinct composited video streams wherein the one of the remaining ones of the multiple video streams indicated by the selection data is the selected one of the multiple video streams located in the primary region.

Referring to FIG. 9, the method 700 may include one or more of the additional operations 900 regarding compositing call-in video feeds. The method 700 may further include, at 910, serving an interactive portion of the user interface configured for enabling a client to provide one of the multiple video streams to the one or more computer servers using an Internet Protocol (IP). The method 700 may further include, at 920, selecting a subset of the multiple video streams that are received from client sources via the interactive portion of the user interface. The method 700 may further include, at 930, preparing a one of the multiple video streams by compositing the subset of the multiple video streams, wherein the one of the multiple video streams includes a matrix of different display regions each configured for displaying a corresponding different one of the subset of the multiple video streams.

Referring to FIG. 10, the method 700 may include one or more of the additional operations 1000 regarding ancillary services in conjunction with serving related streams of composited video. The method 700 may further include, at 1010, serving a text newsfeed in a window of the user interface with a window containing a display of the multiple distinct composited video streams. The method 700 may further include, at 1020, serving a text chat stream in a window of the user interface with a window containing a display of the multiple distinct composited video streams.

Referring to FIG. 11, the method 700 may include one or more of the additional operations 1100 regarding ancillary services in conjunction with serving related streams of composited video. The method 700 may further include, at 1110, serving a schedule for planned content programs comprising multiple distinct composited video streams in a window of the user interface with a window containing a display of the multiple distinct composited video streams. The method 700 may further include, at 1120, serving an interactive object for accessing an archive of past content programs comprising multiple distinct composited video streams in a window of the user interface with a window containing a display of the multiple distinct composited video streams. The method 700 may further include, serving a schedule for planned competitive video game programs comprising multiple distinct composited video streams in a window of the user interface with a window containing a display of the multiple distinct composited video streams.

Figure 12:
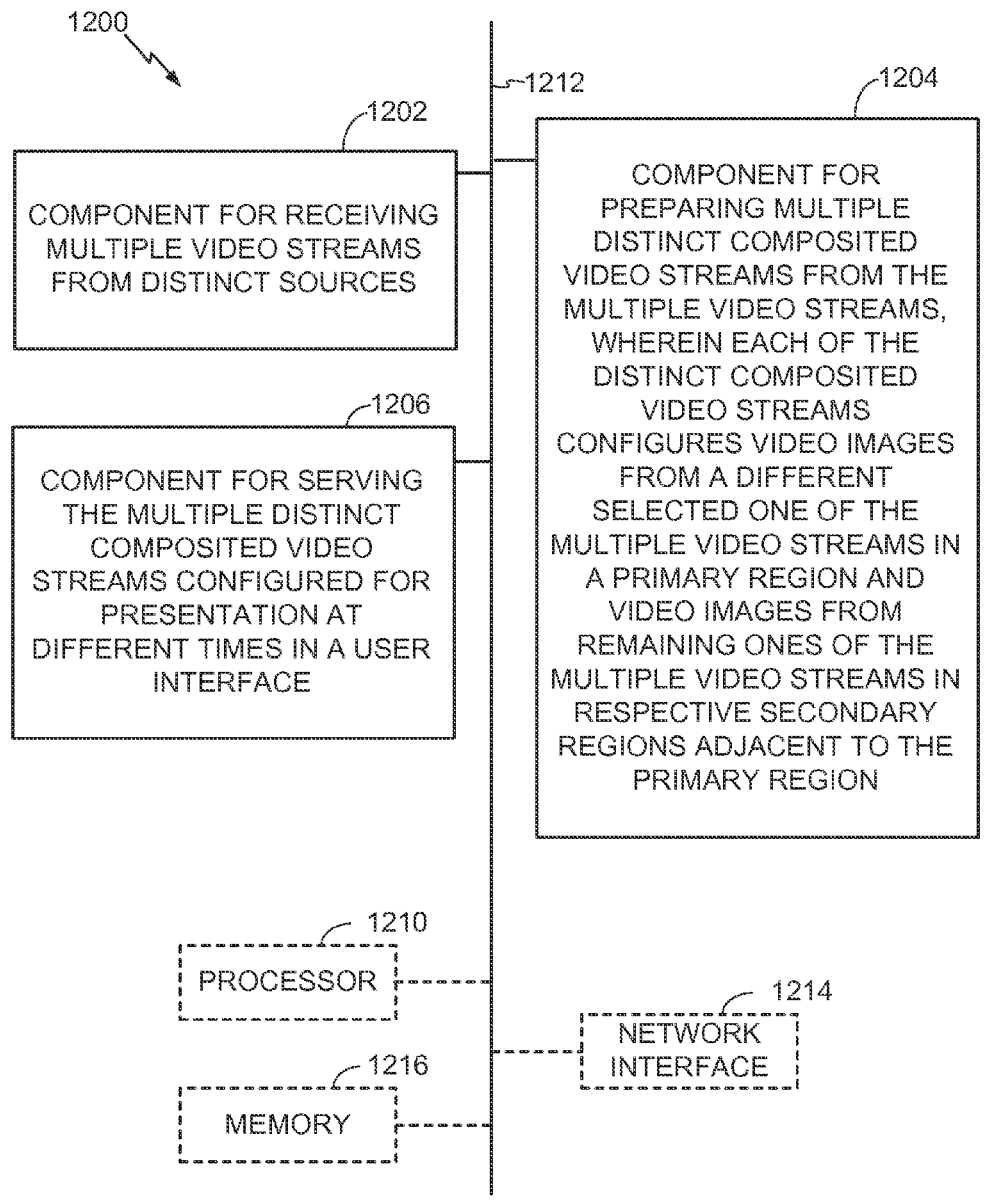
FIG. 12 shows aspects of an apparatus for multi-camera interactive live engagement.
Figure 13A:
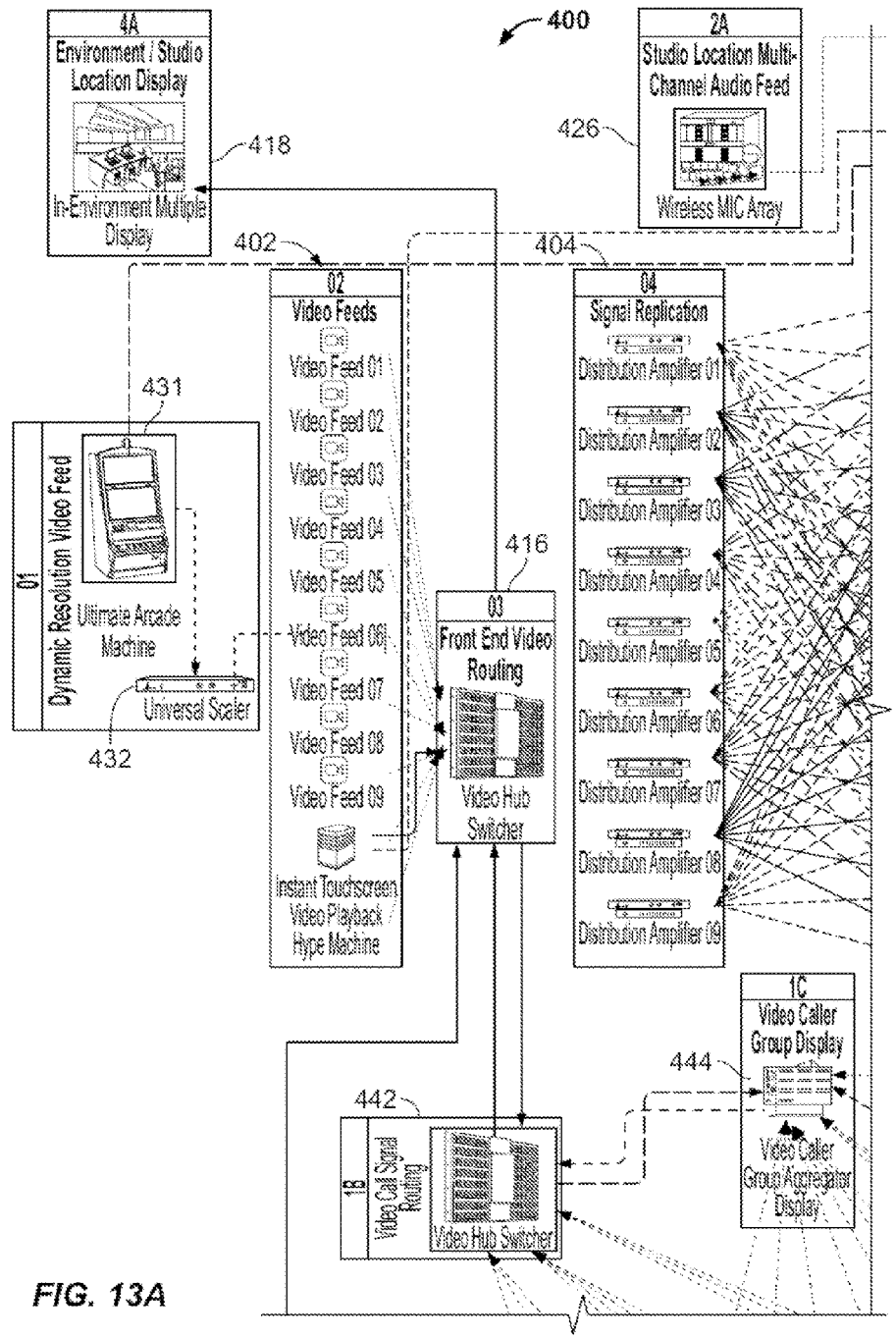
FIGS. 13A-D together provide an enlarged, more detailed view of the system 400 shown in FIG. 4.
Figure 13B:
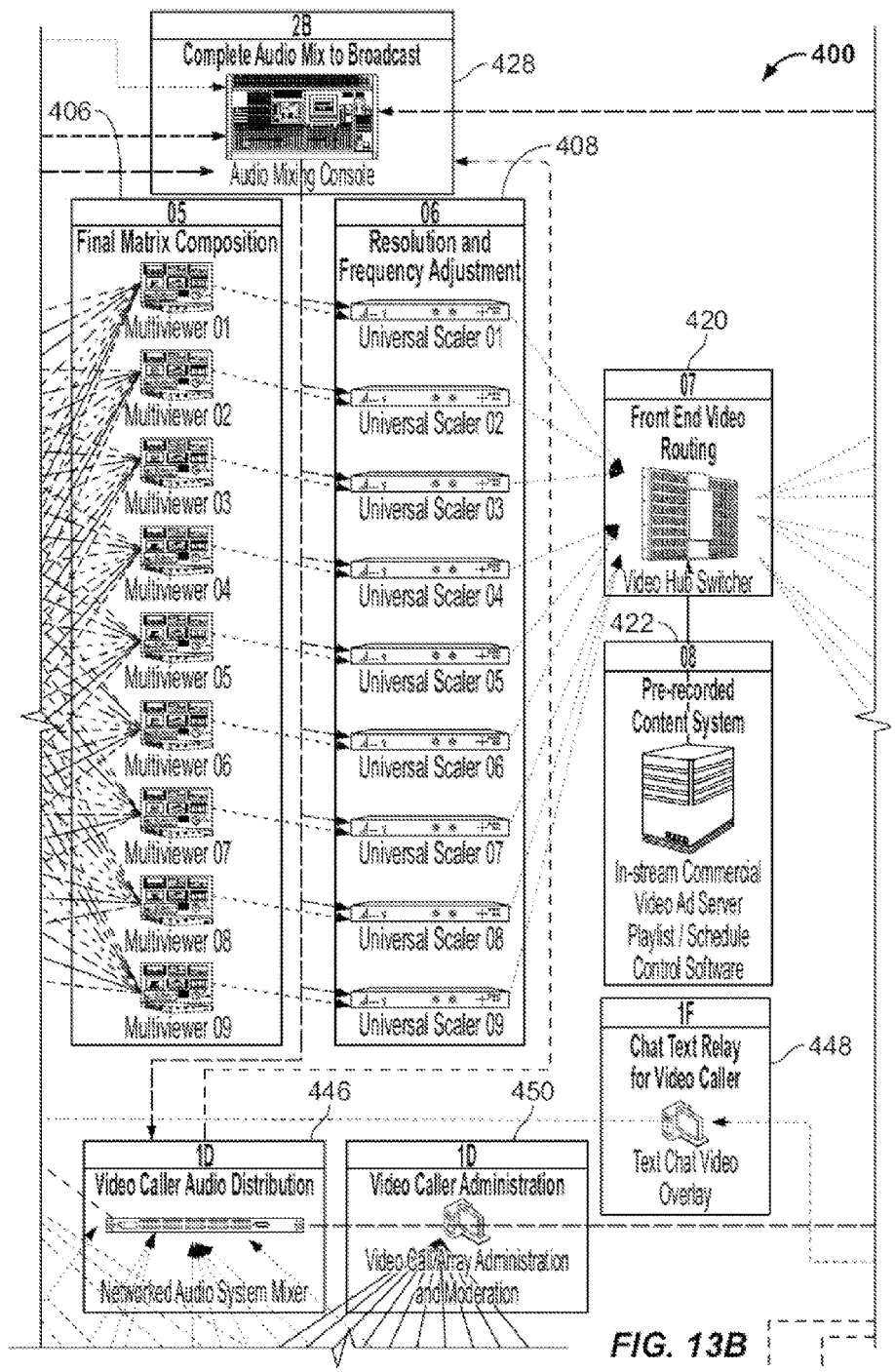
Figure 13B:
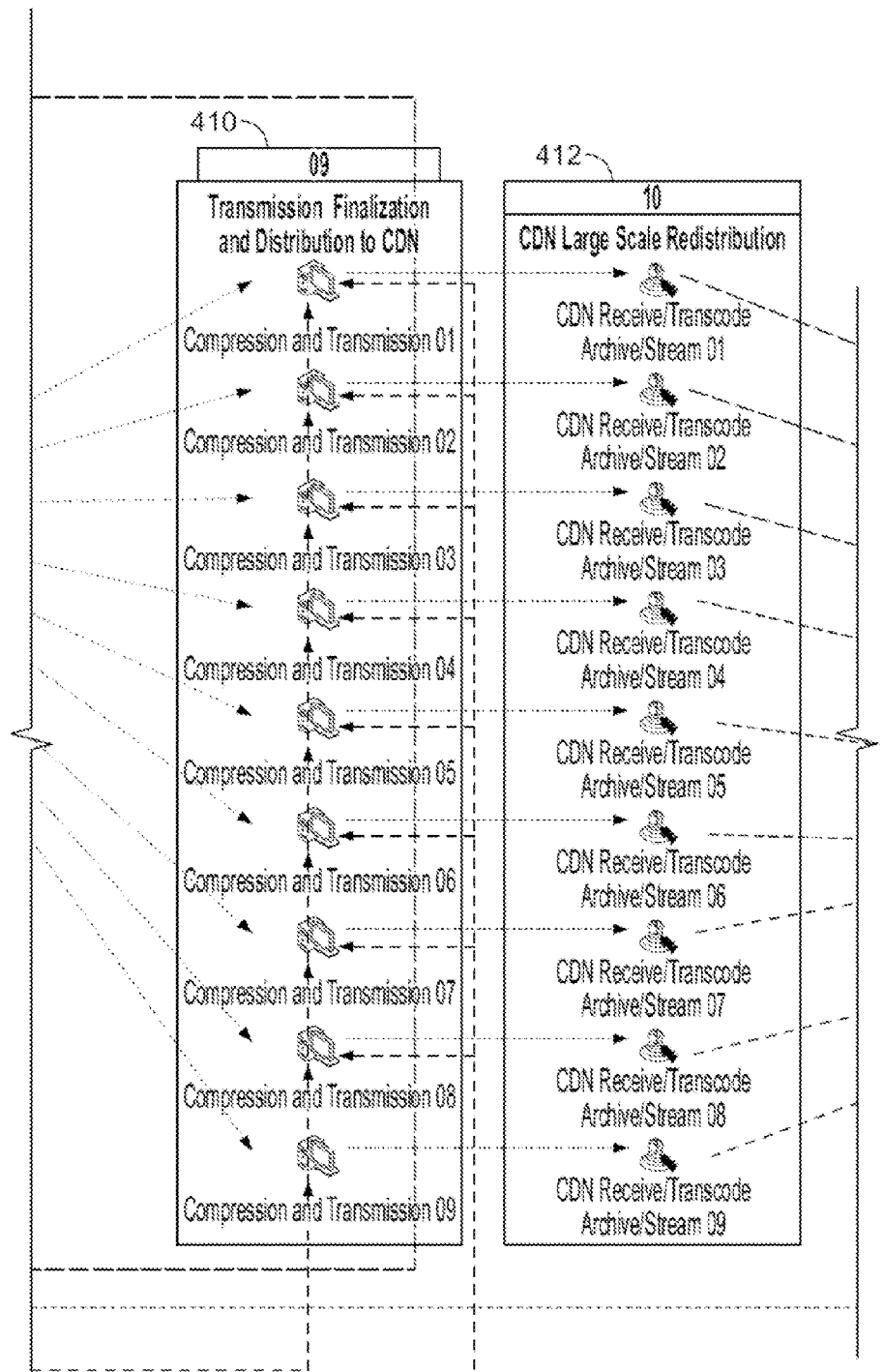
Figure 13C:
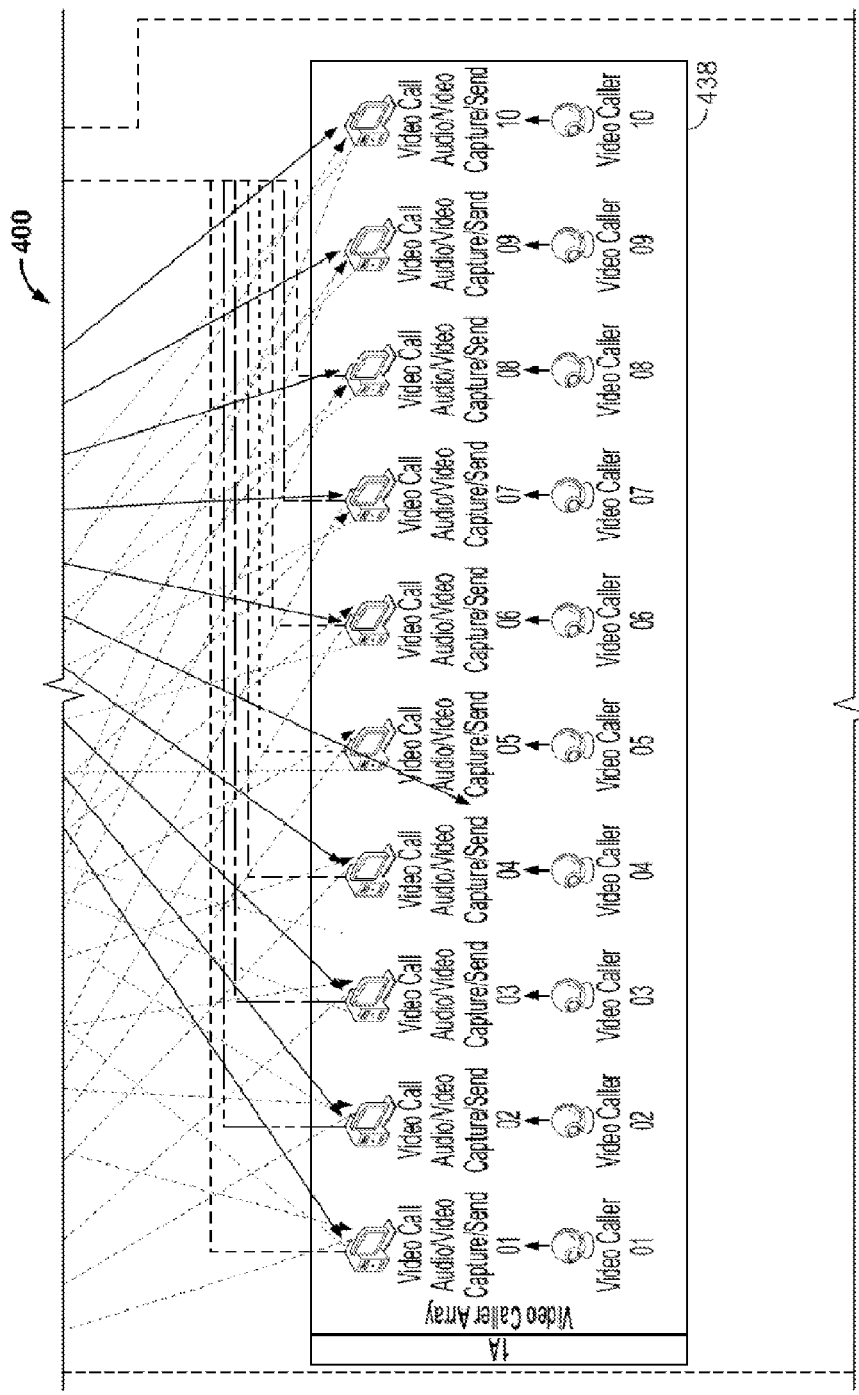
Figure 13C:
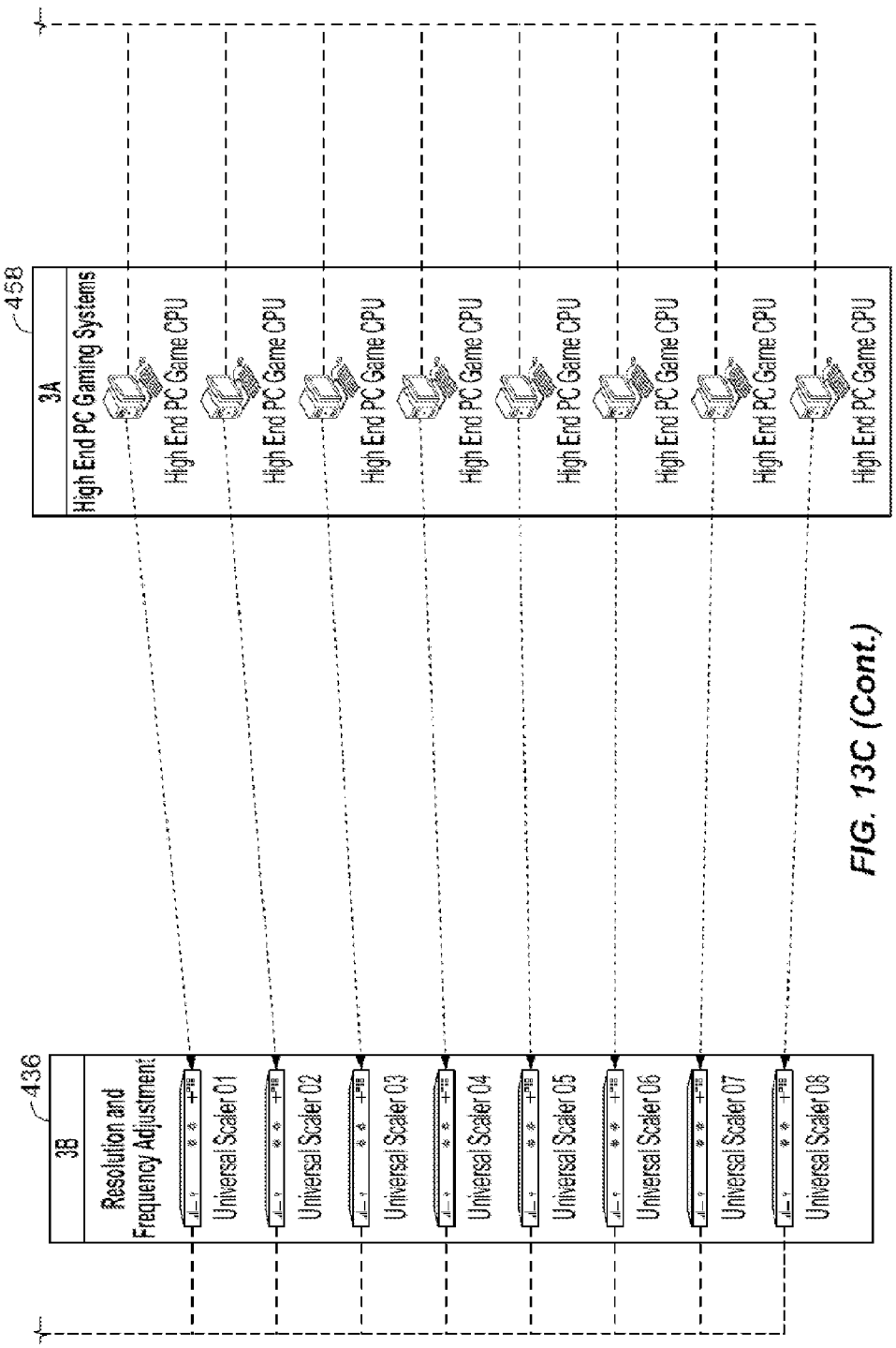
Figure 13D:
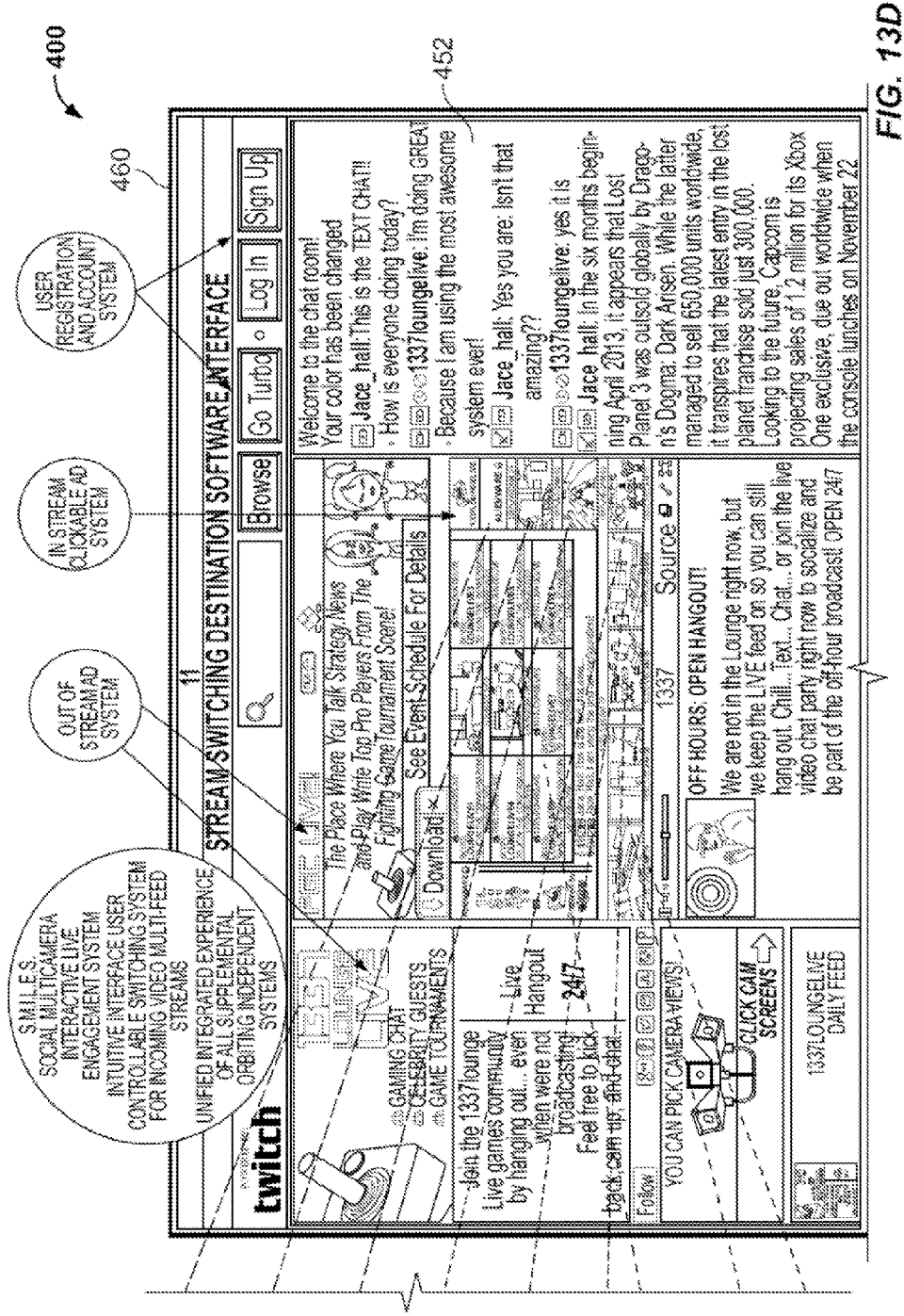

Consistent with method 700, and as further illustrated by FIG. 12, an apparatus 1200 for decoding a video signal may perform method 1800 and any of the more detailed algorithms described herein. The apparatus 1200 may comprise an electronic component or module 1202 for receiving multiple video streams from distinct sources. The apparatus 1200 may comprise an electronic component or module 1204 for preparing multiple distinct composited video streams from the multiple video streams, wherein each of the distinct composited video streams configures video images from a different selected one of the multiple video streams in a primary region and video images from remaining ones of the multiple video streams in respective secondary regions adjacent to the primary region. In addition, the apparatus 1200 may comprise an electronic component or module 1206 for serving the multiple distinct composited video streams configured for presentation at different times in a user interface.

The apparatus 1200 may optionally include a processor module 1210 having at least one processor; in the case of the apparatus 1200 this may be configured as a digital signal processor, rather than as a general purpose microprocessor. The processor 1210, in such case, may be in operative communication with the modules 1202-1206 via a bus 1212 or similar communication coupling. The processor 1210 may effect initiation and scheduling of the processes or functions performed by electrical components 1202-1206, and other operations described in connection with the 1800 or any of the detailed algorithms described herein above. In related aspects, the apparatus 1200 may include a network interface module 1214 through with the processor 1210 may send and receive information to clients and other servers. In further related aspects, the apparatus 1200 may optionally include a module for storing information, such as, for example, a memory device/module 1218. The computer readable medium or the memory module 1218 may be operatively coupled to the other components of the apparatus 1200 via the bus 1212 or the like. The memory module 1218 may be adapted to store computer readable instructions and data for effecting the processes and behavior of the modules 1202-1206, and subcomponents thereof, or the processor 1210, or the methods disclosed herein, and other operations of the SMILE system as disclosed herein. The memory module 1218 may retain instructions for executing functions associated with the modules 1202-1206. While shown as being external to the memory 1218, it is to be understood that the modules 1202-1206 may exist at least partly within the memory 1218.

Figure 14:
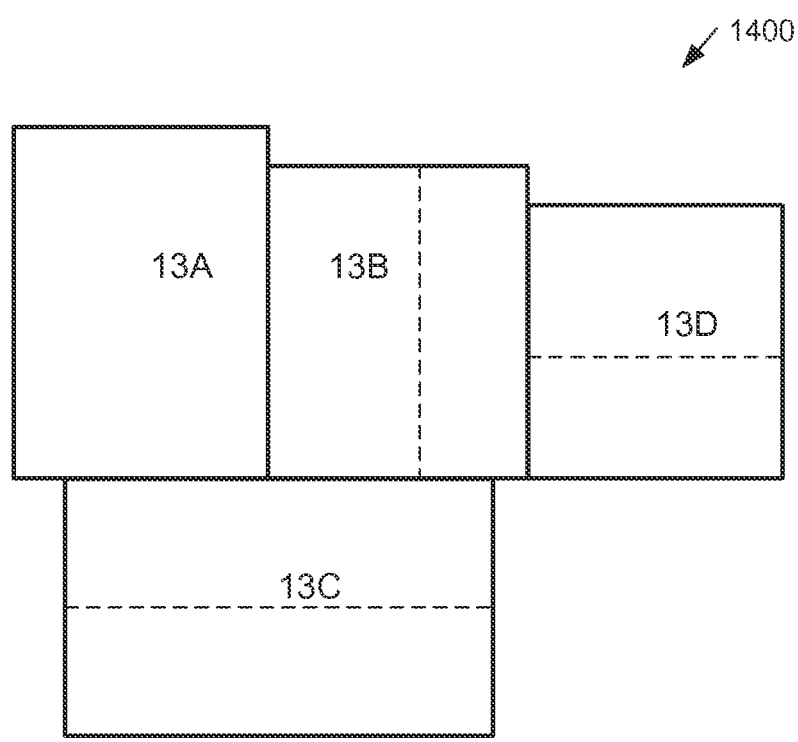
FIG. 14 shows how FIGS. 13A-D should be pieced together to provide the more detailed view of the system 400.

FIGS. 13A-D together provide an enlarged, more detailed view of the system 400 shown in FIG. 4. FIG. 14 provides a diagram 1400 showing how FIGS. 13A-D should be pieced together to provide the more detailed view of the system 400. Certain features of the schematic diagram of FIGS. 13A-D are discussed below, wherein "SMILES" stands for SMILE System.

A universal scaler 432 may be incorporated before one or several of the SMILES video feeds 402 to normalize the video signal and accommodate any rapid changes of source input signal resolution or frequency. For example, in an embodiment, a computer based arcade machine 431 may emulate several different historic video game platforms which each has their own unique resolutions that can be initiated at any time. Thus, the machine may output a video feed or feeds of different resolution or frequency characteristics. These different video feeds may be processed by the universal scaler 432 and converted to a uniform video feed format before being passed to the video feed router 416.

SMILES has been conceptually designed to accommodate an unlimited number of video sources 402 (nine of many shown). These sources may be grouped together as an array and individually connected to a multi-input electronically controlled video hub 416. Video input that is intended to be included into the user selectable interactive portion of the SMILES presentation and experience passes through the primary front end video routing hub 416. System control decisions by the operator regarding how many and which video input feeds are sent to the signal replication array 404 may be made during this stage of the signal flow process.

Using a distribution amplifier components of the replication distribution amplifier array 404, each independent video feed from the front end video router 416 may be replicated by "X" times, wherein "X" is the total number of video feeds that the SMILES operator intends to appear inside the final matrix composition. For example, to service a 3×3 matrix, the video feed from each source may be replicated nine times. Respective ones of the replicated video feeds are provided to each of the "X" number of matrix composition processes (nine shown) of a multiviewer array 406. For each signal set of (X) being sent from each distribution amplifier, a corresponding capable multiviewer component of the matrix composition multiviewer array 406 receives each set of video feeds for multi signal aggregation, layout and single channel compositing. The multiple video feeds, now arranged into a single layout and channel from each multiviewer component 406 may then be sent to a resolution and frequency adjustment array 408. At the resolution and frequency adjustment array 408, each final matrix composition single channel is independently received and converted to a preferred uncompressed resolution and frequency determined by the SMILES operator for a set of corresponding output audio/video feeds. Final audio intended to be broadcast across all streams equally may be received from a complete audio mix to broadcast component 428 and incorporated into the audio/video feeds through the adjustment array 408.

Back end video routing may be performed using a video hub switching component 420. Signals are received for SMILES operator control regarding the corresponding routing arrangement of specific video feeds to match the corresponding final user controllable interactive destination interface. Back end video routing at 428 may also be used to disrupt the interactive video feed entirely and switch the entire multi-camera broadcast to display the video feed of a pre-recorded content system 422. The pre-recorded content system server 422 may serve all desired prerecorded content that SMILES operators want to display in a non-multi-view format. Content playback and programming may be playlist oriented and driven by custom schedule control software.

Transmission finalization and distribution to a content distribution network (CDN) may be performed by a compression and transmission array 410. At the array 410, each final matrix composition single channel from array 406 may be independently received from the back end video routing component 420, converted to a preferred compressed resolution and frequency determined by the SMILES operator, and transmitted via internet to the CDN service provider. Software supporting additional video composition and audio can be overlaid and added if desired. Audio-video signals from both a video caller array 438 and high end PC gaming systems 458 may be received and optionally available for distribution as well. Multiple independent compressed streams representing all selectable video viewpoints are produced at this stage and then sent to a CDN large scale redistribution array 412. The SMILE system may leverage pre-existing CDN technology. For example, a standard issue separate account may be created at the CDN for each individual video stream to be received then transcoded, archived and rebroadcast back to the SMILES stream switching destination software interface 460 operating on the destination client. The CDN bears the burden of bandwidth, not the SMILE system interface 460.

The stream switching destination software interface 460 may be configured as custom software supporting multiple platforms that provide the total user experience and bind all elements of the SMILE system together. The interface 460 may provide an intuitive, client or cloud-based user controllable interface that allows for: seamless switching of incoming multi-feed streams, simple activation/connection of a video call, user registration, account management, text chat, event programming guide, newsfeed ticker, in stream clickable ad system display, out-of-stream ad system display, tournament facilitation, contest facilitation, and direct access to the video archive of past live broadcasts. The complete integration constitutes a unique look and feel as well as establishing a new way of doing things from a user's perspective.

The video caller array 438 may be a specific set of computers that handle the reception and back/forth transmission of multiple independent incoming video calls. Each computer in the array replicates the video and audio of transmissions received/sent and routes those independent replications to video call signal routing 442, video caller group display 444 and a video caller audio distribution component 446. Additionally each independent video call audio may also be routed to transmission finalization and distribution to CDN array 410 for optional layering and compositing into the final outgoing signal. Video call signal routing at component 442 may include aggregation of independent video call and audio signals with selection and control of incoming video call feeds by the SMILES operator. Additionally, compositing may be handled by the video caller group display component 444. Final output of the video call signal router may be directed to the front end video routing component 416 for possible inclusion, at the option of the system operator, into the signal replication array 404 and final broadcast.

At the video caller group display component 444, all independent video calls and total mixed caller audio signal may be aggregated for SMILES operator's dynamically designed display configuration matrix. Live feed of the stream switching destination software interface's 460 text chat system may also be added to the display matrix via the chat text relay for video caller component 448. The final aggregate display may then be output to the video call signal routing component 442 and also back to clients of the video caller array 438 for live display on the remote video callers' client software.

The video caller audio distribution component 446 may handle independent video caller audio received from the video caller array 438 and the complete audio mix to broadcast component 428. The audio may be mixed, processed, and leveled by the distribution component 446 and then sent to video caller group display component 444, and also relayed back to complete audio mix to broadcast component 428 with the added video caller audio signal. A video caller administration component 450 may include a control computer and system program to remotely manage all computers in the video caller array 438. Additionally, user moderation functions may be handled here for video callers specifically.

The chat text relay for video caller component 448 computer capture system may access the stream switching destination software interface's 460 text chat system 452, capture it, and then send that video output to the video caller group display component 444 for transmission via the video caller array 438 to caller client devices (e.g., mobile smart phones). In addition, caller video may be provided to the video signal call routing component 442 for eventual routing to an environment/studio location display device 418. This display device 418 may be whatever video display array the SMILE system operator has set up in their on-location environment.

A studio location multi-channel audio feed (microphone array) 426 may include multiple microphones or other audio feeds from non-video or video sources. The array 426 may be are located at physical location of the SMILE system that the operator intends to be part of the SMILES broadcast, sometimes referred to herein as a "studio." Each independent audio feed may be sent to the complete audio mix to broadcast component 428 for aggregation, leveling and inclusion into final broadcast. This complete audio mix to broadcast component 428 may handle reception of all cumulative audio intended to reach final broadcast unilaterally across all independently broadcasted streams. This audio may include audio streams from studio location multi-channel audio feed 426, video caller audio distribution component 446 and other ancillary systems such as the instant touchscreen video playback hype machine that may be found in sources included in the video feed array 402.

The high end PC gaming systems array 458 may generate video sent to a resolution and frequency adjustment universal scaler array 436 for eventual destination to the front end video routing component 416 and follow on signal replication array 404. Each video stream from the PC gaming systems 458 may be independently received and converted to the preferred uncompressed resolution and frequency of the SMILES operator for eventual distribution to the replication array 404. Audio from the PC gaming systems 458 may be directly routed to the transmission finalization and distribution to CDN array 410, bypassing the complete audio mix to broadcast component 428.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer-readable media may include but are not limited to magnetic storage devices (e.g., hard disk, floppy disk, magnetic strips . . . ), optical disks (e.g., compact disk (CD), digital versatile disk (DVD)), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or non-transitory medium.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for multi-camera interactive live engagement, the method comprising:
   receiving, at one or more computer servers, multiple video streams in real time from distinct video camera sources;
   preparing in real time multiple distinct composited video streams from the multiple video streams, wherein each of the distinct composited video streams is contemporaneous with other ones of the multiple distinct composited video streams and configures video images from a different selected one of the multiple video streams in a primary region and video images from remaining ones of the multiple video streams in respective secondary regions adjacent to the primary region; and
   serving, contemporaneously to multiple client devices, the multiple distinct composited video streams configured for presentation at different times in a user interface, wherein each of the client devices is served only a selected one of the distinct composited video streams for display at any particular time of the different times, wherein the serving further comprises serving a text chat stream in a window of the user interface with a window containing a display of the multiple distinct composited video streams.

2. The method of claim 1, further comprising serving each selected one of the distinct composited video streams over a network, formatted for display in the user interface using a browser application.

3. The method of claim 2, further comprising serving with the each selected one of the distinct composited video streams, a user selection object at least partially overlaying the display and configured to correlate user selection input to respective different ones of the respective secondary regions.

4. The method of claim 3, further comprising receiving selection data from a client, the selection data indicating user selection of one of the respective secondary regions wherein video images from one of the remaining ones of the multiple video streams are placed.

5. The method of claim 4, further comprising swapping the each selected one of the distinct composited video streams served at any particular time to the each of the client devices for a different one of the distinct composited video streams, based on which of the video streams is located in the primary region.

6. The method of claim 1, further comprising serving an interactive portion of the user interface configured for enabling a client to provide one of the multiple video streams to the one or more computer servers using an Internet Protocol (IP).

7. The method of claim 6, further comprising selecting a subset of the multiple video streams that are received from client sources via the interactive portion of the user interface.

8. The method of claim 7, further comprising preparing a one of the multiple video streams by compositing the subset of the multiple video streams, wherein the one of the multiple video streams includes a matrix of different display regions each configured for displaying a corresponding different one of the subset of the multiple video streams.

9. The method of claim 1, further comprising serving a text newsfeed in a window of the user interface with a window containing a display of the multiple distinct composited video streams.

10. The method of claim 1, further comprising serving a schedule for planned content programs comprising multiple distinct composited video streams in a window of the user interface with a window containing a display of the multiple distinct composited video streams.

11. The method of claim 1, further comprising serving an interactive object for accessing an archive of past content programs comprising multiple distinct composited video streams in a window of the user interface with a window containing a display of the multiple distinct composited video streams.

12. The method of claim 1, further comprising serving a schedule for planned competitive video game programs comprising multiple distinct composited video streams in a window of the user interface with a window containing a display of the multiple distinct composited video streams.

13. An apparatus comprising a processor coupled to a memory, the memory holding instructions that when executed by the processor, causes the apparatus to perform operations comprising:
  receiving, via input ports coupled to the processor, multiple video streams in real time from distinct video camera sources;
  preparing in real time multiple distinct composited video streams from the multiple video streams, wherein each of the distinct composited video streams is contemporaneous with other ones of the multiple distinct composited video streams and configures video images from a different selected one of the multiple video streams in a primary region and video images from remaining ones of the multiple video streams in respective secondary regions adjacent to the primary region; and
  streaming, contemporaneously to multiple client devices, the multiple distinct composited video streams configured for presentation in a user interface at different times determined in response to user selection input from the client device, wherein each of the client devices is served only a selected one of the distinct composited video streams for display at any particular time of the different times, wherein the memory holds further instructions for serving a text chat stream to the client device configured for display in a window of the user interface with a window containing a display of the multiple distinct composited video streams.

14. The apparatus of claim 13, wherein the memory holds further instructions for serving each selected one of the distinct composited video streams over a network, formatted for display in the user interface using a browser application.

15. The apparatus of claim 14, wherein the memory holds further instructions for serving with the each selected one of the distinct composited video streams, a user selection object at least partially overlaying the display and configured to correlate the user selection input to respective different ones of the respective secondary regions.

16. The apparatus of claim 15, wherein the memory holds further instructions for receiving the user selection data from a client, the user selection data indicating user selection of one of the respective secondary regions wherein video images from one of the remaining ones of the multiple video streams are placed.

17. The apparatus of claim 16, wherein the memory holds further instructions for swapping the each selected one of the distinct composited video streams served at the any particular time to the each of the client devices for a different one of the distinct composited video streams, based on which of the video streams is located in the primary region.

18. The apparatus of claim 13, wherein the memory holds further instructions for serving an interactive portion of the user interface configured for enabling a client to provide one of the multiple video streams to the input ports using an Internet Protocol (IP).

19. The apparatus of claim 18, wherein the memory holds further instructions for selecting a subset of the multiple video streams that are received from client sources via the interactive portion of the user interface.

20. The apparatus of claim 19, wherein the memory holds further instructions for preparing a one of the multiple video streams by compositing the subset of the multiple video streams, wherein the one of the multiple video streams includes a matrix of different display regions each configured for displaying a corresponding different one of the subset of the multiple video streams.

21. The apparatus of claim 13, wherein the memory holds further instructions for serving a text newsfeed to the client device configured for display in a window of the user interface with a window containing a display of the multiple distinct composited video streams.

22. The apparatus of claim 13, wherein the memory holds further instructions for serving a schedule to the client device for planned content programs comprising multiple distinct composited video streams in a window of the user interface with a window containing a display of the multiple distinct composited video streams.

23. The apparatus of claim 13, wherein the memory holds further instructions for serving an interactive object for accessing an archive of past content programs comprising multiple distinct composited video streams to the client device configured for display in a window of the user interface with a window containing a display of the multiple distinct composited video streams.

24. A non-transitory computer-readable medium holding program instructions, that when executed by a processor, causes a computer to perform operations comprising:
  receiving, via input ports coupled to the processor, multiple video streams in real time from distinct video camera sources;
  preparing in real time multiple distinct composited video streams from the multiple video streams, wherein each of the distinct composited video streams is contemporaneous with other ones of the multiple distinct composited video streams and configures video images from a different selected one of the multiple video streams in a primary region and video images from remaining ones of the multiple video streams in respective secondary regions adjacent to the primary region; and
  streaming, contemporaneously to multiple client devices, the multiple distinct composited video streams configured for presentation in a user interface at different times determined in response to user selection input from the client device, wherein each of the client devices is served only a selected one of the distinct composited video streams for display at any particular time of the different times wherein the serving further comprises serving a text chat stream in a window of the user interface with a window containing a display of the multiple distinct composited video streams.

\* \* \* \* \*